(12) United States Patent
Akiyama et al.

(10) Patent No.: US 6,875,812 B1
(45) Date of Patent: Apr. 5, 2005

(54) RESIN COMPOSITION CONTAINING GRAFT COPOLYMER

(75) Inventors: Yoshikuni Akiyama, Sodegaura (JP); Minoru Sakata, Sodegaura (JP); Goro Yamamoto, Yokohama (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 10/628,534

(22) Filed: Jul. 29, 2003

(30) Foreign Application Priority Data

Jul. 29, 2002 (JP) ........................................ 2002-220188

(51) Int. Cl.⁷ .................... C08L 53/02; C08L 71/12; C08F 297/04
(52) U.S. Cl. .................... 525/98; 525/250; 525/136; 525/379; 525/338; 525/133; 525/396; 525/905
(58) Field of Search ........................ 525/98, 133, 136, 525/316, 338, 379, 396, 250, 905

(56) References Cited

U.S. PATENT DOCUMENTS

| 3,361,851 A | 1/1968 | Gowan |
| 4,383,082 A | 5/1983 | Lee, Jr. |
| 4,863,997 A | 9/1989 | Shibuya et al. |
| 5,332,784 A * | 7/1994 | Shiraki et al. ............... 525/98 |

FOREIGN PATENT DOCUMENTS

| EP | 0115712 A1 | 8/1984 |
| JP | 63-113058 A | 5/1988 |
| JP | 63-225642 A | 9/1988 |
| JP | 2-225563 A | 9/1990 |
| JP | 3-72512 A | 3/1991 |
| JP | 3-185058 A | 8/1991 |
| JP | 4-28739 A | 1/1992 |
| JP | 4-28740 A | 1/1992 |
| JP | 4-183748 A | 6/1992 |
| JP | 5-70679 A | 3/1993 |
| JP | 5-295184 A | 11/1993 |
| JP | 5-320471 A | 12/1993 |
| JP | 6-9628 A | 1/1994 |
| JP | 6-16924 A | 1/1994 |
| JP | 6-57130 A | 3/1994 |
| JP | 6-136702 A | 5/1994 |
| JP | 7-165998 A | 6/1995 |
| JP | 7-166026 A | 6/1995 |
| WO | WO 91/17963 A1 | 12/1991 |

* cited by examiner

Primary Examiner—James J. Seidleck
Assistant Examiner—Olga Asinovsky
(74) Attorney, Agent, or Firm—Birch, Stewart, Kolasch & Birch, LLP

(57) ABSTRACT

An object of the present invention is to provide an agent serving both as a compatibilizer and an impact strength-imparting agent, which is freed from layer separation phenomenon and capable of improving compatibility to a polyphenylene ether and/or a polyolefin without detriment to weld tensile strength and low temperature impact strength. Another object is to provide a resin composition, which is obtained by blending the agent serving both as a compatibilizer and an impact strength-imparting agent with other thermoplastic resin, and which is superior in its impact resistance, particularly impact strength at low temperature, heat resistance and processability. To achieve the above objects, a modified hydrogenated block copolymer having a functional group at the terminal of said hydrogenated block copolymer chain is reacted with a modified polyphenylene ether and/or a modified polyolefin thereby obtaining a resin composition which is containing a graft copolymer formed in a manner such that the hydrogenated block copolymer is grafted to the polyphenylene ether and/or the polyolefin and which has the desired properties.

19 Claims, No Drawings

RESIN COMPOSITION CONTAINING GRAFT COPOLYMER

TECHNICAL FIELD

The present invention relates to a resin composition containing a graft copolymer. The present invention further relates to a composition, which is obtained by polymer alloy formation using the resin composition containing a graft copolymer and other thermoplastic resin, and which is freed from layer separation, and superior in weld tensile strength, impact resistance, particularly impact strength at low temperature, heat resistance and processability.

BACKGROUND ART

Polyphenylene ether has the advantages of mechanical properties, electric properties, heat resistance, low temperature properties, low water absorption and dimensional stability, and the disadvantages of molding processability and impact resistance. Therefore, the polyphenylene ether has been blended with polystyrene or high impact polystyrene, thereby solving such a problem. In such a manner, the polyphenylene ether has been extensively used in the fields of, for example, electric and electronic parts, housings of office instruments, car parts, precision machinery parts and various industrial parts. However, a polyphenylene ether resin composition comprising the polyphenylene ether and high impact polystyrene has a disadvantage of poor chemical resistance in spite of improved impact resistance.

Therefore, there have been extensively developed various polymer alloy obtained by melt-blending the polyphenylene ether with a thermoplastic resin other than the styrenic resin. As a result, polymer allay wherein the thermoplastic resin serves as a matrix and the polyphenylene ether serves as a dispersed phase, and polymer alloy wherein the polyphenylene ether serves as a matrix and the thermoplastic resin serves as a dispersed phase begin to appear on the market. Typical examples of such polymer alloy are a polyamide-polyphenylene ether resin composition, a polyester-polyphenylene ether resin composition, a polyphenylene sulfide-polyphenylene ether resin composition and a polyolefin-polyphenylene ether resin composition. It is not too much to say that a key technology for the polymer alloy formation to obtain these resin compositions includes a technology, by which two or more materials incompatible with one another can be made compatible, thereby attaining to a suitable emulsion dispersion of a dispersed phase, and a technology, by which mechanical strength, particularly impact resistance can be given. Particularly, with respect to the latter to give impact resistance, as the usual way in a conventional polymer alloy formation, it is known that an elastomer component is blended. In many cases, a vinyl aromatic compound-conjugated diene compound block copolymer, and its hydrogenated product, namely a hydrogenated block copolymer have been used.

However, the polyphenylene ether and these block copolymers are incompatible with each other. In order to obtain compatibility, it is important that a content of the vinyl aromatic compound in the block copolymer is increased. Under the present condition, the block copolymer increased in a content of the vinyl aromatic compound cannot give a preferred impact resistance. On the other hand, when the block copolymer decreased in a content of the vinyl aromatic compound because of the impact resistance to be given is blended with the polyphenylene ether, the resulting resin composition exhibits a layer separation phenomenon because of poor compatibility between both polymers. Under the present condition, there is left a problem that such a phenomenon causes remarkable decrease of weld tensile strength.

Among thermoplastic resins constituting these polymer alloy, it is known that a polyolefin resin of a general-purpose resin, particularly a polypropylene resin, which is inferior in its impact resistance, heat resistance and rigidity in spite of properties superior in molding processability, water resistance, oil resistance, acid resistance and alkali resistance, is used in combination with an elastomer component to improve the impact resistance, or blended with a polyphenylene ether resin, so that the polypropylene resin serves as a matrix and the polyphenylene ether resin serves as a dispersed particle, thereby obtaining a resin composition improved in heat resistance and rigidity.

Prior arts relating thereto are as follows. There is proposed a resin composition, which is improved in solvent resistance and impact resistance, and which is obtained by blending a polyphenylene ether with a polyolefin (refer to, for example, U.S. Pat. No. 3,361,851). There is also described a resin composition, which is improved in impact resistance, and which is obtained by blending a polyphenylene ether with a polyolefin and a hydrogenated block copolymer (refer to, for example, U.S. Pat. No. 4,383,082 and European Pat. Pub. No. 115712).

Further, there is proposed a resin composition, which is superior in chemical resistance and processability, and which is obtained by blending a specific hydrogenated block copolymer for the purpose of modifying the resin composition obtained from a polyolefin resin and a polyphenylene ether resin (refer to, for example, JP-A-63-113058, JP-A-63-225642, U.S. Pat. No. 4,863,997, JP-A-3-72512, JP-A-4-183748 and JP-A-5-320471).

Still further, there is proposed a process for producing a resin composition superior in balance between impact resistance and rigidity, wherein a specific manner is applied to obtain the resin composition comprising a polyolefin resin, a polyphenylene ether resin and a specific hydrogenated block copolymer (refer to, for example, JP-A-4-28739 and JP-A-4-28740).

Similarly, there is a proposal that a resin composition produced in a specific manner brings about a resin composition superior in impact resistance (refer to, for example, JP-A-7-16.6026). It is also proposed that a specific hydrogenated block copolymer is blended to modify the resin composition comprising a polyolefin resin and a polyphenylene ether resin, thereby obtaining a resin composition superior in heat resistance, impact resistance and moldability (refer to, for example, JP-A-7-165998).

In addition, there is disclosed a resin composition obtained by carrying out blending of a polyolefin resin and a polyphenylene ether resin in the presence of a rubber-like substance, subjecting the resultant to chemical modification with maleic anhydride using a radical initiator and further adding a diamine compound thereto (refer to, for example, WO91/19762). Herein, it is proposed to use a polyolefin-polyphenylene ether graft product formed from the polyolefin modified with maleic anhydride and the polyphenylene ether modified with maleic anhydride through the diamine compound as a compatibilizer.

On the other hand, the present Applicant has proposed a resin composition comprising a polyphenylene ether resin, a polyolefin resin and a specific hydrogenated block copolymer, which is superior in its compatibility, rigidity and heat resistance and also in its solvent resistance (refer to, for example, JP-A-2-225563, JP-A-3-185058, JP-A-5-70679, JP-A-5-295184, JP-A-6-9828, JP-A-6-16924, JP-A-6-57130 and JP-A-6-136202).

In many of the resin compositions mentioned above, it is the present condition that the hydrogenated block copolymer is used as a compatibilizer because the polyolefin resin and the polyphenylene ether resin are naturally incompatible with each other. The compatibility of the hydrogenated block copolymer serving as the compatibilizer exhibited to the polyolefin, particularly a polypropylene resin, depends upon a kind of a conjugated diene compound used for obtaining the block copolymer prior to the hydrogenation and a vinyl bond state of the conjugated diene compound before the hydrogenation of the soft segment portion in the hydrogenated block copolymer (namely, 1,2-vinyl bond content and 3,4-vinyl bond content). The compatibility exhibited to the polypropylene resin can be remarkably improved with increase in these vinyl bond contents. However, with improvement of the compatibility, a grass transition temperature of a soft segment portion of the hydrogenated block copolymer shifts to a higher temperature side, and as a result, impact strength at low temperature required for the resin composition remarkably deteriorates. Therefore, it is the present condition that the vinyl bond state of the conjugated diene compound before the hydrogenation to obtain the hydrogenated block copolymer, which serves as both the compatibilizer and an impact resistance-imparting agent, is determined in design of a polymer with detriment to any performance (impact strength at low temperature or compatibility). Furthermore, The compatibility of the hydrogenated block copolymer serving as the compatibilizer exhibited to the polyphenylene ether resin depends upon a content of the vinyl aromatic compound in the hydrogenated block copolymer and a molecular weight of the vinyl aromatic compound polymer constituting a hard segment block. It is known that the both can be increased with remarkable improvement of the compatibility exhibited to the polyphenylene ether resin. However, under the present condition, it is not desirable for improving the impact resistance. As mentioned above, with respect to the hydrogenated block copolymer used as the compatibilizer to the polypropylene resin and the polyphenylene ether resin, there is a complex relation of antinomy as to the bond state of the conjugated diene compound before the hydrogenation of the soft segment portion in the hydrogenated block copolymer and the vinyl aromatic compound content in the hard segment portion therein for satisfying the compatibility exhibited to both resins and the impact resistance of the obtained resin composition. It is the present condition that no hydrogenated block copolymer satisfying both performances exists in the world.

DISCLOSURE OF THE INVENTION

An object of the present invention is to provide an agent serving both as a compatibilizer and an impact resistance-imparting agent, which is freed from layer separation phenomenon and capable of improving compatibility to a polyphenylene ether and/or a polyolefin without detriment to weld tensile strength and impact strength at low temperature.

Another object of the present invention is to provide a resin composition, which is obtained by blending the agent serving both as a compatibilizer and an impact resistance-imparting agent with other thermoplastic resin, and which is superior in its impact resistance, particularly impact strength at low temperature, heat resistance and processability.

Seceding from a conventional technology to simply blend a hydrogenated block copolymer with a polyphenylene ether and/or a polyolefin, the present inventors have supposed a new means to improve the compatibility and have aimed at a graft copolymer obtained through reaction under the condition that a ratio between the polyphenylene ether chain and/or polyolefin chain and the hydrogenated block copolymer chain is made as close as possible to 1:1.

As a result of extensive studies on the basis of the point aimed at, it has been found that a polymer having a functional group at the terminal of a block copolymer chain, which is obtained by reacting a living terminal lithium ion group of a vinyl aromatic compound-conjugated diene compound block copolymer chain and a cyclic compound having a specific functional group in a hydrocarbon solvent, is hydrogenated to saturate the double bond originated from the conjugated diene compound present in the block copolymer through the hydrogenation, thereby obtaining a modified hydrogenated block copolymer having a functional group at the terminal of the hydrogenated block copolymer chain. Successively, the obtained block copolymer is subjected to reaction with a modified polyphenylene ether and/or modified polyolefin, which are/is obtained by imparting a specific functional group to a polyphenylene ether and/or polyolefin, thereby obtaining a graft copolymer composition formed in a manner such that the hydrogenated block copolymer is grafted to the polyphenylene ether and/or polyolefin. As a result, the above-mentioned problem can be solved, that is, the compatibility can be improved, the layer separation phenomenon can be solved and the weld tensile strength can be improved. It has been further found that there can be provided a resin composition, which comprises the thus obtained graft copolymer composition and a third thermoplastic resin, and which is superior in impact resistance, particularly impact strength at low temperature, heat resistance and processability. Thereby, the present invention has been obtained.

That is, the present invention provides a resin composition containing a graft copolymer obtained by reacting 1 to 99 parts by weight of (a) an amino group-containing hydrogenated block copolymer obtained through hydrogenation of an amino group-containing block copolymer with 99 to 1 part by weight of (b) a functional group-containing polyphenylene ether having any one functional group selected from a carboxyl group, an acid anhydride group and an epoxy group and/or (c) a functional group-containing polyolefin having any one functional group selected from a carboxyl group, an acid anhydride group and an epoxy group, wherein the amino group-containing block copolymer is obtained by reacting a living terminal lithium ion group of a vinyl aromatic compound-conjugated diene compound block copolymer chain, which is formed using an organic lithium compound as a polymerization initiator in a hydrocarbon solvent with a cyclic compound represented by the formula (1) or (2),

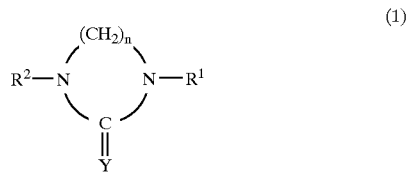

wherein $R^1$ and $R^2$ are independently of each other an alkyl or alkoxy group having 1 to 4 carbon atoms, Y is an oxygen atom or a sulfur atom, and n is an integer of 2 to 4,

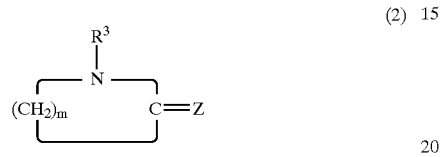

wherein $R^3$ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms.

The present invention also provides a resin composition comprising 1 to 99 parts by weight of the resin composition containing the graft copolymer obtained using the components (a) to (c), and 99 to 1 part by weight of (d) a thermoplastic resin excepting the above-mentioned components (a) to (c).

BEST MODE FOR CARRYING OUT THE INVENTION

The present invention is explained in detail as follows.

The amino group-containing hydrogenated block copolymer used in the present invention as the component (a) is a polymer, which is obtained through hydrogenation of the amino group-containing block copolymer, and which is diminished in its olefinic unsaturated bond originated from the conjugated diene compound to the extent of not more than 90%, preferably not more than 55%, and more preferably not more than 30%. The amino group-containing block copolymer is obtained by reacting a living terminal lithium ion group of a vinyl aromatic compound-conjugated diene compound block copolymer chain, which is formed using an organic lithium compound as a polymerization initiator in a hydrocarbon solvent, with a nitrogen-containing cyclic compound represented by the following formula (1) or (2), thereby appending a secondary amine to the terminal of the vinyl aromatic compound-conjugated diene compound copolymer chain, which is represented by the following formula (3) or (4).

The formula (1) is as follows,

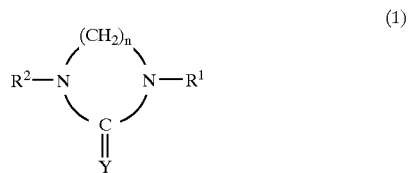

wherein $R^1$ and $R^2$ are independently of each other an alkyl or alkoxy group having 1 to 4 carbon atoms, Y is an oxygen atom or a sulfur atom, and n is an integer of 2 to 4.

Examples of the cyclic compound having the above formula (1) used in the present invention are 1,3-diethyl-2-imidazolidinone, 1,3-dimethyl-2-imidazolidinone, 1,3-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylene-thiourea, N,N'-diethylpropyleneurea, N-methyl-N'-ethylpropyleneurea and 1,3-dimethyl-3,4,5,6-tetrahydro-2(1H)-pyrimidinone. Of these, 1,3-dimethyl-2-imidazolidinone is preferred.

The formula (2) is as follows,

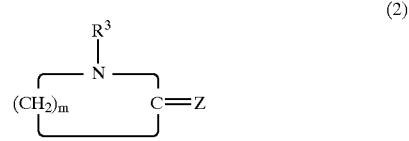

wherein $R^3$ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms.

Examples of the cyclic compound having the above formula (2) are 1-cyclohexyl-2-pyrrolidone, 1-methyl-2-pyrrolidone, 1-ethyl-2-pyrrolidone, 1-propyl-2-pyrrolidone, 1-butyl-2-pyrrolidone, 1-isopropyl-2-pyrrolidone, 1,5-dimethyl-2-pyrrolidone, 1-methoxymethyl-2-pyrrolidone, 1-methyl-2-piperidone, 1,4-dimethyl-2-piperidone, 1-ethyl-2-piperidone, 1-isopropyl-2-piperidone and 1-isopropyl-5,5-dimethyl-2-piperidone. Of these, 1-methyl-2-pyrrolidone and 1-methyl-2-piperidone are preferred, and 1-methyl-2-piperidone is particularly preferred.

The formula (3) is as follows,

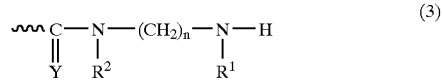

wherein ∿ is a polymer chain containing the conjugated diene compound, $R^1$ and $R^2$ are independently of each other an alkyl or alkoxy group having 1 to 4 carbon atoms, Y is an oxygen atom or a sulfur atom, and n is an integer of 2 to 4.

The formula (4) is as follows,

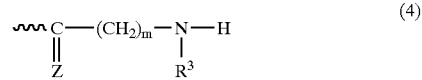

wherein ∿ is a polymer chain containing the conjugated diene compound, $R^3$ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms.

Such a reaction between the living terminal lithium ion group of the vinyl aromatic compound-conjugated diene compound block copolymer with the cyclic compound represented by the above formula (1) or (2) can be carried out in a hydrocarbon solvent in the presence of the living terminal lithium ion group after completion of the polymerization to obtain the vinyl aromatic compound-conjugated diene compound block copolymer. Usually, the cyclic compound represented by the formula (1) or (2) is added thereto in an amount of from 0.25 to 2 mole per mole of the organic lithium compound used for the polymerization. The reaction can be carried out at a temperature ranging from 10 to 120° C. for a reaction period of time of from 1 second to 3 hours.

Such a reaction between the living terminal lithium ion group of the block copolymer containing the conjugated diene compound with the cyclic compound represented by the above formula (1) or (2), thereby producing the secondary amine at the polymer terminal as shown in the formula (3) or (4), is already described in JP-B-4-39495, JP-B-6-18801, JP-B-6-43449, JP-B-6-51727, JP-B-6-18932 and JP-B-6-18933. According to the reaction method described therein, the polymer having the secondary amine at the polymer terminal can be easily obtained. Identification and determination of the secondary amine in the component (a) used in the present invention can be carried out according to the method described in such known arts.

Next, there is mentioned a structure of the vinyl aromatic compound-conjugated diene compound block copolymer, which is a precursor of the component (a) used in the present invention, namely, the amino group-containing hydrogenated block copolymer.

Generally speaking, the precursor can be obtained through block copolymerization of respective monomer units, namely, a vinyl aromatic compound and a conjugated diene compound, and can be shown by a block copolymer structure composed of a polymer block A having the vinyl aromatic compound unit as a main constituent (vinyl aromatic compound content being at least 70%) and a polymer block B having the conjugated diene compound unit as a main constituent (conjugated diene compound content being at least 70%). The vinyl aromatic compound of randomly copolymerized portion contained in the block copolymer may be distributed uniformly or in a taper-like state. Further, in each of the copolymer blocks A and B, more than one portion wherein the vinyl aromatic compound is distributed uniformly and/or in a taper-like state, respectively, may be present at the same time. Furthermore, in each of the copolymer blocks A and B, more than one portion different in their vinyl aromatic compound content may be present at the same time. As an example of the block copolymer composed of the polymer block A having the vinyl aromatic-compound unit as a main constituent (vinyl aromatic compound content being at least 70%) and the polymer block B having the conjugated diene compound unit as a main constituent (conjugated diene compound content being at least 70%), there is generally mentioned a block copolymer having the following formula,

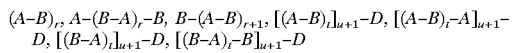

wherein D is a residue of a coupling agent or a residue of an initiator, namely a polyfunctional organic lithium compound, r, t and u are independently of one another an integer of not less than 1, and in general from 1 to 5.

As an example of the vinyl aromatic compound used for obtaining the vinyl aromatic compound-conjugated diene compound block copolymer, there are mentioned one, two or more members selected from the group consisting of styrene, α-methylstyrene, vinyltoluene, p-tert-butylstyrene and diphenylethylene. Of these, styrene is particularly preferred. It is permitted that a content of the vinyl aromatic compound in the vinyl aromatic compound-conjugated diene compound block copolymer is selected from a range of usually from 1 to 95% by weight, preferably from 1 to 80% by weight, and more preferably from 1 to 55% by weight. While, as an example of the conjugated diene compound used for the block copolymer, there are mentioned one, two or more members selected from the group consisting of butadiene, isoprene, 1,3-pentadiene and 2,3-dimethyl-1,3-butadiene. Of these, particularly preferred are butadiene, isoprene and a combination thereof.

A micro-structure, which is a polymerization pattern of the conjugated diene compound in the vinyl aromatic compound-conjugated diene compound block copolymer, can be arbitrarily selected. In case of butadiene, for example, the 1,2-vinyl bond content is from 2 to 85%, preferably from 10 to 85%, and more preferably from 35 to 85%. In case of isoprene, the sum of the 1,2-vinyl bond content and the 3,4-vinyl bond content is from 2 to 85%, preferably from 3 to 75%, and more preferably from 3 to 60%. The 1,2-vinyl bond and the 3,4-vinyl bond may be distributed uniformly or in a taper-like state in the polymer block having the conjugated diene compound unit as a main constituent. Further, with respect to the polymer block having the conjugated diene compound unit as a main constituent, polymer portions different from one another in their 1,2-vinyl bond content or their total content of the 1,2-vinyl bond and 3,4-vinyl bond may be present. For example, respective polymer portions having less than 30% or not less than 30% of the 1,2-vinyl bond content or the total content of the 1,2-vinyl bond and the 3,4-vinyl bond may be present.

A number average molecular weight of the precursor of the component (a), namely the vinyl aromatic compound-conjugated diene compound block copolymer, (a molecular weight calibrated with polystyrene standard according to a gel permeation chromatography) is usually from 1,000 to 1,000,000, preferably from 10,000 to 500,000, and more preferably from 30,000 to 300,000.

The above-mentioned precursor can be obtained through anion polymerization of the conjugated diene compound and the vinyl aromatic compound in a hydrocarbon solvent using an organic lithium compound as a polymerization initiator. As such a hydrocarbon solvent, an aliphatic hydrocarbon, an alicyclic hydrocarbon and an aromatic hydrocarbon can be used. Examples thereof are propane, isobutane, n-hexane, isooctane, cyclopentane, cyclohexane, benzene and toluene. Particularly preferred solvents include n-hexane, cyclohexane and benzene, and these solvents may be used singly or in a mixed solvent of two or more. As the organic lithium compound used as the polymerization initiator, there can be used mono-organolithium compouns such as n-propyllithium, isopropyllithium, n-butyllithium, sec-butyllithium and tert-butyllithium, and polyfunctional organolithium compounds such as dilithiomethane, 1,4-dilithiobutane, 1,4-dilithio-2-ethylcyclohexane, 1,2-dilithio-1,2-diphenylmethane and 1,3,5-trilithiobenzene, and these compounds may be used singly or in a mixture of two or more. The amount of the organic lithium compound can be appropriately determined depending upon the desired number average molecular weight of the vinyl aromatic compound-conjugated diene compound block copolymer through calculation based on a monodisperse polymer (weight average molecular weight/number average molecular weight=1). Further, a polar compound such as ethers, tertiary amines and alkali metal alkoxides may be used for the purpose of controlling the above-mentioned 1,2-vinyl bond and 3,4-vinyl bond contents, namely the micro-structure, which is a polymerization pattern of the conjugated diene compound, or controlling the random state in the vinyl aromatic compound-conjugated diene compound block copolymer chain. Examples thereof are diethyl ether, ethylene glycol dimethyl ether, ethylene glycol di-n-butyl ether, ethylene glycol n-butyl-tert-butyl ether, ethylene glycol di-tert-butyl ether, diethylene glycol dimethyl ether, triethylene glycol dimethyl ether, tetrahydrofuran, α-methoxymethyltetrahydrofuran, dioxane, 1,2-dimethoxybenzene, triethylamine, N,N,N',N'-tetramethylethylenediamine, potassium tert-amyl oxide and potassium tert-butyl oxide. These compounds may be used singly or in a mixture of two or more. Such a polar compound can be used in an amount of 0 mole or more, preferably 0 to 300 mole per mole of the organic lithium compound.

As explained above, the living terminal lithium ion group of the vinyl aromatic compound-conjugated diene compound block copolymer chain characterized as above can be subjected to reaction with the cyclic compound represented by the formula (1) or (2) in the hydrocarbon solvent, thereby producing the amino group-containing vinyl aromatic compound-conjugated diene compound block copolymer having the secondary amine at the terminal of the polymer chain. Further, the thus obtained amino group-containing vinyl aromatic compound-conjugated diene compound block copolymer is mixed with a hydrogenation catalyst and hydrogen gas in a hydrocarbon solvent to effect hydrogenation. As a result, the olefinic unsaturated bond originated from the conjugated diene compound present in the polymer is diminished to the extent of not more than 90%, preferably not more than 55%, and more preferably not more than 30% based on the initial amount of the unsaturated bond, thereby obtaining the amino group-containing hydrogenated block copolymer of the component (a). The hydrogenation can be carried out according to any method, which is not limited as far as it can diminish the olefinic unsaturated bond originated from the conjugated diene compound present in the amino group-containing vinyl aromatic compound-conjugated diene compound block copolymer. As the hydrogenation method, there are mentioned methods described in U. K. Patent No. 1,020,720 and U.S. Pat. Nos. 3,333,024 and 4,501,857.

The functional group-containing polyphenylene ether having any one functional group selected from a carboxyl group, an acid anhydride group and an epoxy group, which is used as the component (b) in the present invention, and whose precursor before the addition of functionality is a polyphenylene ether. The polyphenylene ether is a homopolymer, copolymer or a mixture thereof, which has a repeating unit represented by the following formula (5),

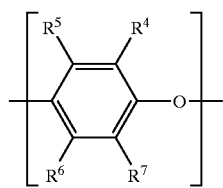

(5)

wherein $R^4$, $R^5$, $R^6$ and $R^7$ may be the same or different from one another, and are each one selected from a hydrogen, a hologen and a primary or secondary lower alkyl having 1 to 7 carbon atoms, phenyl, haloalkyl, aminoalkyl, hydrocarbyloxy or halohydrocarbyloxy group, wherein the halohydrocarbyloxy group has at least two carbon atoms between which a halogen atom and an oxygen atom are present, and which has a number average molecular weight calibrated with polystyrene standard according to GPC (gel permeation chromatography) of not less than 1,000, preferably from 1,500 to 50,000, and more preferably from 1,500 to 30,000.

Specific examples of the polyphenylene ether are poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether) and phenylene ether copolymers such as copolymers between 2,6-dimethylphenol and other phenols (for example, 2,3,6-trimethylphenol and 2-methyl-6-butylphenol). Of these, poly(2,6-dimethyl-1,4-phenylene ether) and the copolymer between 2,6-dimethylphenol and 2,3,6-trimethylphenol (the content of 2,3,6-trimethylphenol in the copolymer is from 5 to 60% by weight) are preferred, and poly(2,6-dimethyl-1,4-phenylene ether) is more preferred.

The polyphenylene ether, which is the precursor of the functional group-containing polyphenylene ether used as the component (b) in the present invention, can be obtained according to any method, which is not limited as far as it is capable of producing a polyphenylene ether having the above-mentioned number average molecular weight. For example, 2,6-dimethylphenol can be subjected to oxidation polymerization using a cuprous chloride-amine complex as a catalyst according to Hay described in U.S. Pat. No. 3,306,874, thereby easily obtaining the desired polyphenylene ether. Besides, there are methods described in U.S. Pat. Nos. 3,306,875, 3,257,357, 3,257,358 and 4,788,277, JP-B-52-17880, and Japanese Patent Nos. 1,803,133, 1,803,134 and 1,803,136.

The functional group-containing polyphenylene ether used as the component (b) in the present invention is the one prepared by adding any one of a carboxyl group, an acid anhydride group or an epoxy group to the above-mentioned precursor polyphenylene ether. In order to add the functional group to the polyphenylene ether, a functional group-containing compound including a carboxyl group-containing compound, an acid anhydride-containing compound and an epoxy (or glycidyl) group-containing compound and the polyphenylene ether are reacted with each other, thereby obtaining the desired compound.

Examples of the functional group-containing compound are carboxylic acid compounds such as citric acid, acrylic acid, methacrylic acid, maleic acid, fumaric acid, itaconic acid and citraconic acid, acid anhydride compounds such as maleic anhydride, citraconic anhydride and itaconic anhydride and glycidyl compounds such as glycidyl methacrylate, glycidyl acrylate, vinyl glycidyl ether, glycidyl ether of hydroxylalkyl (meth)acrylate, glycidyl ether of polyalkyleneglycol (meth)acrylate and glycidyl itaconate. Further, as the epoxy compound, there are mentioned a polyfunctional epoxy compound containing two or more oxirane rings in the molecule, a bis-phenol A type resin represented by the following formula (6),

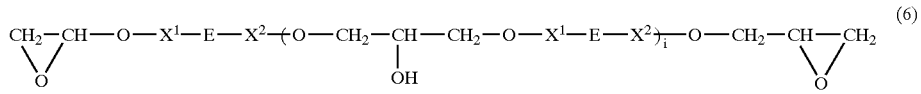

(6)

wherein $X^1$ and $X^2$ are each an aromatic hydrocarbon, E is an aliphatic hydrocarbon, and i is 0 or an integer of not less than 1,
and a polyglycidyl ether compounds having no unsaturated group represented by the following formula (7),

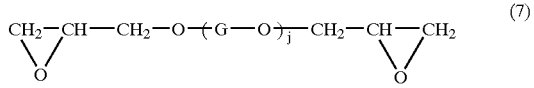

(7)

wherein G is an aliphatic or aromatic hydrocarbon, and j is 0 or an integer of not less than 1.

Among these functional group-containing compounds, the most preferred compound is maleic anhydride.

With respect to how to react the polyphenylene ether with the above-mentioned functional group-containing compound, there are mentioned a process wherein the polyphenylene ether in a non-molten state is subjected to the reaction in a manner such that the polyphenylene ether is brought into contact with the functional group-containing compound in a gas or liquid state at a temperature not higher than a melting point of the polyphenylene ether (20 to 230° C.) in the absence of any solvent, a process wherein the polyphenylene ether in a heated and molten state (250 to 310° C.) is subjected to the reaction with the above-mentioned functional group-containing compound, and a process wherein using an organic solvent the polyphenylene ether in a solution or slurry state is subjected to the reaction with the above-mentioned functional group-containing compound at ambient temperature (23° C.) to 150° C. In these reaction processes, a radical initiator may be used or may not be used when the functional group-containing compound to be used contains an ethylenically unsaturated group. In the case where the functional group-containing compound is the one containing an ethylenically unsaturated group, it is considered that other ethylenically unsaturated compounds copolymerizable therewith, for example, styrene, may be present therein at the same time. However, in such a case, an unnecessary free functional group-containing copolymer is produced. In the present invention, therefore, it is recommended that the functional group-containing compound having an ethylenically unsaturated group, which is used for the modification of the polyphenylene ether, is used singly. Incidentally, an amount of the above-mentioned functional group-containing compound to be used for the modification reaction of the polyphenylene ether, an amount of the radical initiator to be used and reaction temperature can be determined arbitrarily depending upon the desired amount of the functional group to be added to the polyphenylene ether.

The functional group-containing polyphenylene ether, which is used as the component (b) in the present invention, is the one obtained by adding the functional group-containing compound to the precursor polyphenylene ether in an amount of from 0.05 to 30 parts by weight, preferably from 0.1 to 20 parts by weight, and more preferably from 0.2 to 10 parts by weight, based on 100 parts by weight of the precursor. The actual amount of the functional group added to the polyphenylene ether can be usually known by means of Fourier transform infrared spectroscopy (FTIR) or proton NMR.

Next, the functional group-containing polyolefin having any one functional group selected from a carboxyl group, an acid anhydride group and an epoxy group, which is used as the component (c) in the present invention, and whose precursor before the addition of functionality is a polyolefin usually used as a molding material according to extrusion molding and injection molding, is a resin-like or elastomer-like polymer, and may have or may not have a crystalline melting point. Examples of the polyolefin are high density polyethylene, ultra high molecular weight high density polyethylene, low density polyethylene, linear low density polyethylene, ultra low density polyethylene having density of lower than 0.90, isotactic polypropylene, ultra high molecular weight isotactic polypropylene, polybutene-1 and poly(4-methyl-1-pentene). Other examples thereof are copolymers of two or more compounds selected from ethylene, propylene and other α-olefins, which are substantially freed from a carboxyl group, an acid anhydride group, an epoxy group and other functional groups originated from a copolymerization monomer. Specific examples thereof are ethylene/propylene copolymer, ethylene/octene copolymer, ethylene/butene-1 copolymer, propylene/ethylene (random or block) copolymer and propylene/1-hexene copolymer. Of these polyolefins, polyethylene, polypropylene and poly(4-methyl-1-pentene) are preferred. These polyolefins may be used singly or in combination of two or more.

In order to add the functional group to such a polyolefin, a functional group-containing unsaturated compound such as a carboxyl group-containing unsaturated compound, an acid anhydride group-containing unsaturated compound and an epoxy (glycidyl) group-containing unsaturated compound are subjected to reaction with the polyolefin, thereby obtaining the desired product.

Examples of the functional group-containing unsaturated compound used for the addition of the functional group to the polyolefin are carboxylic acid compounds such as acrylic acid, methacrylic acid, maleic acid, fumaric acid, itaconic acid and citraconic acid, acid anhydride compounds such as maleic anhydride, citraconic anhydride and itaconic anhydride and glycidyl compounds such as glycidyl methacrylate, glycidyl acrylate, vinyl glycidyl ether, glycidyl ether of hydroxylalkyl (meth)acrylate, glycidyl ether of polyalkyleneglycol (meth)acrylate and glycidyl itaconate.

Among these functional group-containing unsaturated compounds, the most preferred compound is maleic anhydride. With respect to how to react the polyolefin with the above-mentioned functional group-containing unsaturated compound, there are mentioned a process wherein the polyolefin in a heated and molten state (150 to 300° C.) is subjected to the reaction with the above-mentioned functional group-containing unsaturated compound, and a process wherein using an organic solvent the polyolefin in a solution or slurry state is subjected to the reaction with the above-mentioned functional group-containing unsaturated compound at ambient temperature (23° C.) to 200° C. In these reaction processes, a radical initiator may be used or may not be used. It is considered that other ethylenically unsaturated compounds copolymerizable with the functional group-containing unsaturated compound, for example, styrene, may be present therein at the same time. However, in such a case, an unnecessary free functional group-containing copolymer is produced. In the present invention, therefore, it is recommended that the functional group-containing unsaturated compound, which is used for the modification of the polyolefin, is used singly. Incidentally, an amount of the above-mentioned functional group-containing unsaturated compound to be used for the modification reaction of the polyolefin, an amount of the radical initiator to be used and reaction temperature can be determined arbitrarily depending upon the desired amount of the functional group to be added to the polyolefin.

The functional group-containing polyolefin, which is used as the component (c) in the present invention, is the one obtained by adding the functional group-containing unsaturated compound to the polyolefin in an amount of from 0.05 to 30 parts by weight, preferably from 0.1 to 20 parts by weight, and more preferably from 0.2 to 10 parts by weight based on 100 parts by weight of the polyolefin. Such an amount of the functional group in the polymer can be usually known by means of Fourier transform infrared spectroscopy (FTIR) or proton NMR.

The graft copolymer-containing resin composition in accordance with the present invention is a composition obtained by reacting 1 to 99 parts by weight of (a) the above-mentioned amino group-containing hydrogenated block copolymer and 99 to 1 part by weight of (b) the functional group-containing polyphenylene ether having any one functional group selected from a carboxyl group, an acid anhydride group and an epoxy group and/or (c) the functional group-containing polyolefin having any one functional group selected from a carboxyl group, an acid anhydride group and an epoxy group. Usually, the reaction can be carried out using respective components, namely the amino group-containing hydrogenated block copolymer as the component (a), the functional group-containing polyphenylene ether as the component (b) and/or the functional group-containing polyolefin as the component (c) in a heated and molten state or a solution state prepared by dissolving respective components in a solvent capable of dissolving said components (chloroform, benzene, toluene, xylene or the like) within a temperature range from ambient temperature (23° C.) to 350° C., thereby obtaining a new graft copolymer formed in a manner such that the amino group-containing hydrogenated block copolymer as the component (a) is grafted to of the functional group-containing polyphenylene ether as the component (b) and/or the functional group-containing polyolefin as the component (c).

According to these reactions, there can be obtained a graft copolymer freed from layer separation. Examples thereof are polyphenylene ether-(hydrogenated polybutadiene-polystyrene), polyphenylene ether-(polystyrene-hydrogenated polybutadiene-polystyrene), (polyphenylene ether-hydrogenated polybutadiene-polystyrene)$_k$, polyolefin-(hydrogenated polybutadiene-polystyrene), polyolefin-(polystyrene-hydrogenated-polybutadiene-polystyrene) and (polyolefin-hydrogenated polybutadiene-polystyrene)$_k$, wherein k is an integer of not less than 1, and the polyolefin included in each of the formulas originates in the functional group-containing polyolefin as the component (c). When the component (a), namely the amino group-containing hydrogenated block copolymer is used in a larger amount, there can be obtained a composition comprising an elastomer-like graft copolymer, which is freed from layer separation and superior in heat resistance. When the component (b), namely the functional group-containing polyphenylene ether and/or the component (c), namely the functional group-containing polyolefin are (is) used in a larger amount, there can be obtained a composition comprising a resin-like or elastomer-like graft copolymer, which is freed from layer separation and superior in weld tensile strength, heat resistance and impact resistance.

Further, the resin composition containing the graft copolymer obtained above in accordance with the present invention can be blended with other thermoplastic resin, namely a component (d), thereby obtaining a new polymer alloy.

That is, there is provided a resin composition comprising 1 to 99 parts by weight of the resin composition containing the graft copolymer obtained through the reaction of the component (a) and the component (b) and/or the component (c), and 99 to 1 part by weight of the component (d), namely the other thermoplastic resin.

Particularly, when the resin composition is so obtained that the thermoplastic resin as the component (d) constitutes a matrix and the components constituting the graft copolymer form a dispersed phase, the obtained resin composition is remarkably improved in its impact strength, particularly impact strength at low temperature, and superior in its heat resistance and processability.

The thermoplastic resin used as the component (d) in the present invention is a polymer excluding the above-mentioned amino group-containing hydrogenated block copolymer as the component (a), the functional group-containing polyphenylene ether as the component (b) and/or the functional group-containing polyolefin as the component (c). Examples thereof are at least one member selected from polyolefins, styrenic resins, polyamides, polyesters, polyphenylene ethers, polyphenylene sulfides and liquid crystal polyesters.

Polyolefins as the component (d) include, for example, isotactic polypropylene, poly(4-methyl-1-pentene), polybutene-1, high density polyethylene, ultra high molecular weight high density polyethylene, -low density polyethylene, linear low density polyethylene, ultra low density polyethylene having density of lower than 0.90, and copolymers of two or more compounds selected from ethylene, propylene and other α-olefins, for example, ethylene/propylene copolymer, ethylene/butene-1 copolymer, ethylene/octene copolymer, propylene/ethylene (random or block) copolymer, propylene/1-hexene copolymer and propylene/4-methyl-1-pentene copolymer. The copolymer may be one which is substantially freed from a carboxyl group, an acid anhydride group, an epoxy group and other functional groups originated from a copolymerization monomer. These polyolefins can be used singly or in combination of two or more. Among these polyolefins, isotactic polypropylene, propylene/ethylene block copolymer, propylene/ethylene random copolymer and polyethylene are preferred. These polyolefins are usually elastomer-like and resin-like.

Styrenic resins as the component (d) include, for example, atactic polystyrene (rubber reinforced atactic polystyrene: one called high impact polystyrene), rubber-reinforced polystyrene (HIPS) and syndiotactic polystyrene.

Polyamides as the component (d) include, for example, polyamide 6, polyamide 6, 6, polyamide 4, 6, polyamide 11, polyamide 12, polyamide 6, 10, polyamide 6, 12, polyamide 6/6, 6, polyamide 6/6, 12, polyamide MXD (m-xylylenediamine)/6, polyamide 6, T, polyamide 6, I, polyamide 6/6, T, polyamide 6/6, I, polyamide 6, 6/6, T, polyamide 6, 6/6, I, polyamide 6/6, T/6, I, polyamide 6,6/6, T/6, I, polyamide 6/12/6, T, polyamide 6, 6/12/6, T, polyamide 6/1216, I, polyamide 6, 6/12/6, I, poly(p-phenyleneterephthalamide), poly(p-benzamide), poly(4,4'-benzanilideterephthalamide), poly(p-phenylene-4,4'- biphenylenedicarboxyamide), poly(p-phenylene-2,6-naphthalenedicarboxyamide), poly(2-chloro-p-phenyleneterephthalamide) and p-phenylenediamine/2,6-dichloro-p-phenylenediamine/terephthalic dichloride copolymer.

Polyesters as the component (d) include, for example, polyethylene terephthalate, polytrimethylene terephthalate and polybutylene terephtalate. Of these, polytrimethylene terephthalate and polybutylene terephthalate are preferred.

the thermoplastic resin as the component (d) may be at least two members selected from the group consisting of polyphenylene sulfides, polyethylene terephthalates, polytrimethylene terephthalates, polybutylene terephthalates, polyphenylene ethers, polycarbonates, ethylene-glycidyl methacrylate copolymers, styrene-glycidyl methacrylate copolymers and styrene/2-isopropenyl-2-oxazoline copolymers.

Next, an inorganic filler usable as a component (e) in the present invention is a component capable of affording various functions to the resin composition comprising the above-mentioned components (a) to (d). The inorganic filler can be selected depending upon purposes, thereby affording rigidity, heat resistance, heat conductivity, electrical conductivity, sliding property, vibration suppression, or improving molding shrinkage and coefficient of linear expansion. Examples of the inorganic filler, namely the component (e) exhibiting such effects are inorganic salts, glass fiber (long glass fiber, chopped strand glass fiber), glass flake, glass beads, carbon fiber, whisker, mica, talc, carbon black, titanium oxide, calcium carbonate, potassium titanate, wallastonite, heat conductive substances (graphite, aluminum nitride, boron nitride, alumina, beryllium oxide, silicon dioxide, magnesium oxide, aluminum nitrate and barium sulfate), electrically conductive metal fiber, electrically conductive metal flake, electrical conductivity-carrying carbon black and electrical conductivity-carrying carbon fiber. These may be used singly or in combination of two or more. For the purpose of improving dispersibility to the above-mentioned components (a) to (d), such inorganic fillers may be those treated with a conventional surface treating agent such as fatty acid type or organosilane type coupling agents and organic titanate type coupling agents, and those treated according to the intercalation process, so that the interfacial phase of the inorganic filler is organized with an ammonium salt or the like. Further, for the purpose of improving handling at the time of processing, those treated with a conventional urethane type or epoxy type binder can be also suitably used. The component (e) may be used in an amount of usually from 1 to 250 parts by weight, preferably from 1 to 150 parts by weight, and more preferably from 1 to 100 parts by weight, based on 100 parts by weight of the resin composition comprising the above-mentioned components (a) to (d).

In the present invention, if desired, other additives in the addition to the above-mentioned component (a) to (e) such as antioxidants, metal deactivators, flame retarders including magnesium hydroxide, aluminum hydroxide, melamine and melamine derivatives, organic phosphoric acid ester compounds, inorganic phosphorus compounds, aromatic halogen flame retarders, silicone flame retarders and fluorine polymers, plastisizers including various oil, low molecular weight polyethylene, epoxidized soybean oil, polyethylene glycol and fatty acid esters, flame retarder auxiliaries including antimony trioxide, weather and light resistance improving agents, slip agents, various colorants and mold lubricants may be incorporated in a manner such that characteristic features and effects of the present invention are not impaired.

The resin composition comprising the components (a) and ((b) and/or (c)) in accordance with the present invention can be obtained using respective components as follows. That is, there are mentioned a process wherein the amino group-containing hydrogenated block copolymer (a), the functional group-containing polyphenylene ether (b) and/or the functional group-containing polyolefin (c) are subjected to melt-kneading at the same time, thereby obtaining the graft copolymer-containing resin composition, a process wherein the amino group-containing hydrogenated block copolymer (a) and the functional group-containing polyphenylene (b) are subjected to melt-kneading at the same time, thereby obtaining a melt-kneaded product, the obtained melt-kneaded product is added to the functional group-containing polyolefin (c), and both are subjected to melt-kneading at the same time, thereby obtaining the graft copolymer-containing resin composition, and a process wherein the amino group-containing hydrogenated block copolymer (a) and the functional group-containing polyolefin (c) are subjected to melt-kneading at the same time, thereby obtaining a melt-kneaded product, the obtained melt-kneaded product is added to the functional group-containing polyphenylene ether (b), and both are subjected to melt-kneading at the same time, thereby obtaining the graft copolymer-containing resin composition.

Further, the resin composition comprising the components (a) and ((b) and/or (c)) and (d) in accordance with the present invention can be obtained by melt-kneading the graft copolymer-containing resin composition obtained using the above-mentioned respective components (a) and ((b) and/or (c)) with the other thermoplastic resin used as the component (d).

As specific examples of how to obtain the resin composition, there are mentioned various processes such as a process wherein from a first supplying port at the beginning of an extruder, the amino group-containing hydrogenated block copolymer as the component (a) and the functional group-containing polyphenylene ether as the component (b) are supplied and melt-kneaded at the same time, and from a second supplying port provided at the middle of the extruder, the thermoplastic resin as the component (d) is supplied and further melt-kneaded together with the resin composition containing the graft copolymer, which is obtained through the reaction between the component (a) and the component (b), and which is in a molten state, a process wherein from a first supplying port at the beginning of an extruder, the amino group-containing hydrogenated block copolymer as the component (a) and the functional group-containing polyolefin as the component (c) are supplied and melt-kneaded at the same time, and from a second supplying ort provided at the middle of the extruder, the thermoplastic resin as the component (d) is supplied and further melt-kneaded together with the resin composition containing the graft copolymer, which is obtained through the reaction between the component (a) and the component (c), and which is in a molten state, and a process wherein from a first supplying port at the beginning of an extruder, the amino group-containing hydrogenated block copolymer as the component (a), the functional group-containing polyphenylene ether as the component (b) and the functional group-containing polyolefin as the component (c) are supplied and melt-kneaded at the same time, and from a second supplying port provided at the middle of the extruder, the thermoplastic resin as the component (d) is supplied and further melt-kneaded together with the resin composition containing the graft copolymer, which is obtained through the reaction of the component (a), the component (b) and the component (c), and which is in a molten state. In addition to the processes mentioned above, the thermoplastic resin as the component (d) may be supplied under co-existence of the amino group-containing hydrogenated block copolymer as the component (a), the functional group-containing polyphenylene ether as the component (b) and/or the functional group-containing polyolefin as the component (c).

Incidentally, the inorganic filler as the component (e) may be directly added to the resin composition comprising the above-mentioned components (a) to (d) in the melt-kneaded state, thereby obtaining the inorganic filler-containing resin composition in accordance with the present invention. It is permitted that the inorganic filler as the component (e) is added collectively to the composition comprising the above-mentioned components (a) to (d) in the melt-kneaded state, or the component (e) is divided and then separately added thereto.

As a melt-kneading machine used for carrying out these processes, there are mentioned, for example, a single screw extruder, a twin screw extruder, a roll, a kneader, Brabender plastograph, Banbury mixer and other heating melt-kneading machines. Of these, the most preferred is a melt-kneading method using a twin screw extruder. At this time, a melt-kneading temperature is not particularly limited, and can be arbitrarily selected from a range of usually from 150 to 350° C.

How to mold the graft copolymer-containing resin composition in accordance with the present invention is not particularly limited. Various molding methods such as injection molding, metal in-mold molding, outsert molding, blow molding, extrusion molding, sheet molding, heat press molding, rotating molding and lamination molding can be applied.

The graft copolymer-containing resin composition in accordance with the present invention is the one obtained through the reaction of a specific modified hydrogenated block copolymer and a modified polyphenylene ether and/or a modified polyolefin. Therefore, it is possible to attain remarkably improved compatibility exhibited to both polyphenylene ether component and polyolefin component, which cannot be attained according to a conventional resin composition comprising a polyphenylene ether and/or polyolefin and a hydrogenated block copolymer. As a result, there can be provided a resin composition improved in layer separation and weld tensile strength, and moreover provided a resin composition comprising the graft copolymer-containing resin composition and a thermoplastic resin different therefrom, which is improved in impact strength at low temperature and superior in heat resistance and processability, and which is very suitable as a molding material.

EXAMPLE

The present invention is explained with reference to Examples, which are not intended to limit the present invention.

Materials used are as follows.

Amino Group-Containing Hydrogenated Block Copolymer as the Component (a)

(a-1): In a reactor equipped with a stirrer, which had been purged with nitrogen gas, polymerization was carried out using n-butyllithium as a polymerization initiator in a cyclohexane solvent, thereby obtaining a block copolymer having a structure of polystyrene-polybutadiene-polystyrene, a number average molecular weight of 40,000, a bonded styrene content of 30% by weight and a 1,2-vinyl bond content due to butadiene of 38%, whose polymer chain terminal showed a living lithium ion structure. After completion of the polymerization, 1,3-dimethyl-2-imidazolidinone was added thereto in an amount of 1.5 mole per mole of the lithium ion present in the polymer solution calculated from the amount of n-butyllithium used, and the reaction was carried out at 95° C. for 10 minutes. Thereafter, according to the method described in U.S. Pat. No. 4,501,857, hydrogenation was continued until an ethylenically unsaturated bond content in the polybutadiene portion reached less than 20%, thereby obtaining a polymer of a degree of hydrogenation of 81.6%. After completion of the hydrogenation, 2,6-di-tert-butyl-p-cresol as a stabilizer against heat degradation was added to the polymer solution in an amount of 0.3 part by weight based on 100 parts by weight of the polymer, and then the solvent, cyclohexane was heat-removed, thereby obtaining a hydrogenated block copolymer having a structure of polystyrene-hydrogenated polybutadiene-polystyrene, wherein the secondary amine was added to the terminal of its polystyrene chain, as the component (a-1).

(a-2): Polymerization of (a-1) was repeated to obtain the block copolymer having a structure of polystyrene-polybutadiene-polystyrene, whose polymer chain terminal showed a living lithium ion structure. Thereafter, the polymer solution was transferred from the reactor to another reactor, which had been purged with nitrogen gas, and then, according to the method described in U.S. Pat. No. 4,501,857, hydrogenation of the transferred block copolymer solution in the reactor was continued until an ethylenically unsaturated bond content in the polybutadiene portion reached less than 20%, thereby obtaining a polymer of a degree of hydrogenation of 82.0%. After completion of the hydrogenation, 2,6-di-tert-butyl-p-cresol as a stabilizer against heat degradation was added to the polymer solution in an amount of 3 parts by weight based on 100 parts by weight of the polymer, and then the solvent, cyclohexane was heat-removed, thereby obtaining a hydrogenated block copolymer having a structure of polystyrene-hydrogenated polybutadiene-polystyrene as the component (a-2).

(a-3): Synthesis of a polymer was carried out according to the process described in the above-item (a-1), thereby obtaining a hydrogenated block copolymer having a structure of polystyrene-hydrogenated polybutadiene-polystyrene, a number average molecular weight of 102,000, a bonded styrene content of 30% by weight, a 1,2-vinyl bond content due to butadiene before the hydrogenation of 43%, and a degree of hydrogenation of 99.2%, wherein the secondary amine was added to the terminal of its polystyrene chain, as the component (a-3).

(a-4): A hydrogenated block copolymer, wherein no secondary amine was added to the terminal of its polymer chain, was synthesized according to the process described in the above-item (a-2) in the synthesis to obtain the above-mentioned component (a-3), thereby obtaining a hydrogenated block copolymer having a structure of polystyrene-hydrogenated polybutadiene-polystyrene, a number average molecular weight of 102,000, a bonded styrene content of 30% by weight, a 1,2-vinyl bond content due to butadiene before the hydrogenation of 43%, and a degree of hydrogenation of 99.0% as the component (a-4).

(a-5): Synthesis of a polymer was carried out according to the process described in the above-item (a-1), thereby obtaining a hydrogenated block copolymer having a structure of polystyrene-hydrogenated polybutadiene-polystyrene, a number average molecular weight of 93,000, a bonded styrene content of 28% by weight, a 1,2-vinyl bond content due to butadiene before the hydrogenation of 80%, and a degree of hydrogenation of 99.1%, wherein the secondary amine was added to the terminal of its polystyrene chain, as the component (a-5).

(a-6): A hydrogenated block copolymer, wherein no secondary amine was added to the terminal of its polymer chain, was synthesized according to the process described in the above-item (a-2) in the synthesis to obtain the above-mentioned component (a-5), thereby obtaining a hydrogenated block copolymer having a structure of polystyrene-hydrogenated polybutadiene-polystyrene, a number average molecular weight of. 93,000, a bonded styrene content of 28% by weight, a 1,2-vinyl bond content due to butadiene before the hydrogenation of 80%, and a degree of hydrogenation of 99.3%, as the component (a-6).

(a-7): Synthesis of a polymer was carried out according to the process described in the above-item (a-1), thereby obtaining a hydrogenated block copolymer having a structure of polystyrene-hydrogenated polyisoprene-polystyrene, a number average molecular weight of 86,000, a bonded styrene content of 25% by weight, the sum of a 1,2-vinyl bond content and a 3,4-vinyl bond content due to isoprene before the hydrogenation of 4%, and a degree of hydrogenation of 99.0%, wherein the secondary amine was added to the terminal of its polystyrene chain, as the component (a-7).

(a-8) A hydrogenated block copolymer, wherein no secondary amine was added to the terminal of its polymer chain, was synthesized according to the process described in the above-item (a-2) in the synthesis to obtain the above-mentioned component (a-7), thereby obtaining a hydrogenated block copolymer having a structure of polystyrene-hydrogenated polyisoprene-polystyrene, a number average molecular weight of 86,000, a bonded styrene content of 25% by weight, the sum of a 1,2-vinyl bond content and a 3,4-vinyl bond content due to isoprene before the hydrogenation of 4%, and a degree of hydrogenation of 99.0%, as the component (a-8).

Functional Group-Containing Polyphenylene Ether as the Component (b)

(b-1): Poly(2,6-dimethyl-1,4-phenylene ether) having a number average molecular weight of 1,800 and a phenolic hydroxyl group at the terminal of its polymer chain was synthesized. To 100 parts by weight of the polyphenylene ether was added 5 parts by weight of maleic anhydride, and the mixture was melt-kneaded using a twin screw extruder equipped with a vent port (ZSK-40: manufactured by WERNER & PFLEIDERER, Germany), which had been heated to 250 to 300° C. Extrusion was carried out while removing unreacted maleic anhydride under reduced pressure, thereby obtaining a functional group-containing polyphenylene ether, wherein 3 parts by weight of maleic anhydride was added thereto, as the component (b-1).

(b-2): In (b-1), the poly(2,6-dimethyl-1,4-phenylene ether) having a number average molecular weight of 1,800 and a phenolic hydroxyl group at the terminal of its polymer chain, which was left unmodified with maleic anhydride, was taken as the component (b-2).

(b-3): Poly(2,6-dimethyl-1,4-phenylene ether) having a number average molecular weight of 6,200 and a phenolic hydroxyl group at the terminal of its polymer chain was synthesized. To 100 parts by weight of the polyphenylene ether was added 2 parts by weight of maleic anhydride, and the mixture was melt-kneaded using a twin screw extruder equipped with a vent port (ZSK-40: manufactured by WERNER & PFLEIDERER, Germany), which had been heated to 250 to 300° C. Extrusion was carried out while removing unreacted maleic anhydride under reduced pressure, thereby obtaining a functional group-containing polyphenylene ether, wherein 1.1 parts by weight of maleic anhydride was added thereto, as the component (b-3).

(b-4): In (b-3), the poly(2,6-dimethyl-1,4-phenylene ether) having a number average molecular weight of 6,200 and a phenolic hydroxyl group at the terminal of its polymer chain, which was left unmodified with maleic anhydride, was taken as the component (b-4).

(b-5): Poly(2,6-dimethyl-1,4-phenylene ether) having a number average molecular weight of 19,000 and a phenolic hydroxyl group at the terminal of its polymer chain was synthesized. To 100 parts by weight of the polyphenylene ether was added 1 part by weight of maleic anhydride, and the mixture was melt-kneaded using a twin screw extruder equipped with a vent port (ZSK-40: manufactured by WERNER & PFLEIDERER, Germany), which had been heated to 250 to 300° C. Extrusion was carried out while removing unreacted maleic anhydride under reduced pressure, thereby obtaining a functional group-containing polyphenylene ether, wherein 0.5 part by weight of maleic anhydride was added thereto, as the component (b-5).

(b-6): In (b-5), the poly(2,6-dimethyl-1,4-phenylene ether) having a number average molecular weight of 19,000 and a phenolic hydroxyl group at the terminal of its polymer chain, which was left unmodified with maleic anhydride, was taken as the component (b-6).

(b-7): Poly(2,6-dimethyl-1,4-phenylene ether) having a number average molecular weight of 24,000 and a phenolic hydroxyl group at the terminal of its polymer chain was synthesized. To 100 parts by weight of the polyphenylene ether was added 1 part by weight of maleic anhydride, and the mixture was melt-kneaded using a twin screw extruder equipped with a vent port (ZSK-40: manufactured by WERNER & PFLEIDERER, Germany), which had been heated to 250 to 300° C. Extrusion was carried out while removing unreacted maleic anhydride under reduced pressure, thereby obtaining a functional group-containing polyphenylene ether, wherein 0.4 part by weight of maleic anhydride was added thereto, as the component (b-7).

(b-8): In (b-7), the poly(2,6-dimethyl-1,4-phenylene ether) having a number average molecular weight of 24,000 and a phenolic hydroxyl group at the terminal of its polymer chain, which was left unmodified with maleic anhydride, was taken as the component (b-7).

(b-9): Poly(2,6-dimethyl-1,4-phenylene ether) having a number average molecular weight of 9,000 and a phenolic hydroxyl group at the terminal of its polymer chain was synthesized. To 100 parts by weight of the polyphenylene ether was added 6 parts by weight of a bisphenol A type epoxy resin (Grade 250 manufactured by ASAHI KASEI EPOXY CO., LTD.), and the mixture was thoroughly mixed. Thereafter, the mixture was closed in an autoclave, and the reaction was carried out under heating at 150° C. for 2 hours. The reaction product was dissolved in toluene. Thereafter, A great excess amount of methanol was added thereto, thereby precipitating a polymer. The precipitated polymer was separated by filtration, and then vacuum-dried for 2 hours under conditions of 150° C. and 0.1 mmHg. The obtained functional polyphenylene ether was dissolved in chloroform-d to be measured according to 270 MHz NMR. A chemical shift of the peak was determined on the basis of the peak of tetramethylsilane (0.00 ppm). A number of the epoxy group per molecule of the polyphenylene ether was determined by an area ratio between a peak due to 3,5-position proton of the aromatic ring in the polyphenylene ether (6.47 ppm) and a peak due to the epoxy group (2.74, 2.89, 3.34 ppm). As a result, it was found that the functional group-containing polyphenylene ether obtained as the component (b-9) had an added epoxy resin content of 4 parts by weight based on 100 parts by weight of the polyphenylene ether.

(b-10): In (b-9), the poly(2,6-dimethyl-1,4-phenylene ether) having a number average molecular weight of 9,000 and a phenolic hydroxyl group at the terminal of its polymer chain, which was left unmodified with the epoxy resin, was taken as the component (b-10).

Functional Group-Containing Polyolefin as the Component (c)

(c-1): Isotactic polypropylene having an added maleic anhydride content of 0.5% by weight and MFR of 10 was taken as (c-1).

(c-2): Isotactic polypropylene having an added maleic anhydride content of 1.0% by weight and MFR of 16 was taken as (c-2)

(c-3): Ethylene/octene copolymer (octene content 25% by weight) having an added maleic anhydride content of 0.7% by weight and MFR of 13 was taken as (c-3).

(c-4): Ethylene/octene copolymer (octene content 25% by weight) having no added maleic anhydride and MFR of 7.2 was taken as (c-4).

Other Thermoplastic Resin as the Component (d)

(d-1): Polyamide, a commercial name: UBE Nylon 6-1013B, manufactured by UBE INDUSTRIES, LTD. was taken as a component (d-1).

(d-2): As polypropylene, isotactic polypropylene having a density of 0.906 and a melt flow rate of 0.4 was taken as a component (d-2).

(d-3): Polybutylene terephthalate, a commercial name: DURANEX® 2002, manufactured by WINTECH POLYMER, LTD. was taken as a component (d-3).

(d-4): Polyphenylene sulfide, a commercial name: TORELINA-M2588, manufactured by Toray Industries, Inc. was taken as a component (d-4).

(d-5): Polyethylene, low density polyethylene (homopolymer) having a density of 0.920 and a melt flow rate of 0.4 was taken as a component (d-5).

(d-6): Poly(2,6-dimethyl-1,4-phenylene ether) having a number average molecular weight of 22,000 and a phenolic hydroxyl group at the terminal of its polymer chain was taken as a component (d-6).

(d-7): Poly(2,6-dimethyl-1,4-phenylene ether) having a number average molecular weight of 16,000 and a phenolic hydroxyl group at the terminal of its polymer chain was taken as a component (d-7).

(d-8): Styrene-glycidyl methacrylate copolymer (weight average molecular weight 110,000) having a glycidyl methacrylate content of 5% by weight was taken as a component (d-8).

Inorganic Filler as the Component (e)

(e-1): Glass flake having an average particle diameter of 600 µm, an average thickness of 5 µm and an average aspect ratio of 120, which had been treated with aminosilane was taken as a component (e-1).

(e-2): Glass fiber having a diameter of 13 µm and an average length of 3 mm, which had been treated with aminosilane was taken as a component (e-2).

Determination of the graft copolymer and evaluation of physical properties were carried out as follows.

(1) Determination of Graft Copolymer

With respect to a composition obtained through the reaction between the amino group-containing hydroganated block copolymer as the component (a) and the functional group-containing polyphenylene ether as the component (b), 0.05 g of said composition was dissolved in 50 g of chloroform to prepare a solution sample. The solution sample was subjected to measurement of molecular weight according to GPC (gel permeation chromatography) with use of an ultraviolet detector, whose wavelength for detecting the polyphenylene ether was controlled to 283 nm. When a certain compound containg polyphenylene ether was detected in a region of a molecular weight higher than that shown by the functional group-containing polyphenylene ether single substance, the graft copolymer caused through the reaction between the amino group-containing hydroganated block copolymer as the component (a) and the functional group-containing polyphenylene ether as the component (b) was judged to be present. Incidentally, as a standard substance as a guide of the molecular weight, a commercially available monodisperse polystyrene was used.

(2) Tensile Strength and Weld Tensile Strength Retention

With respect to a resin-like polymer, the tensile strength was measured according to ASTM D638 under the condition of 23° C. With respect to an elastomer-like polymer, the tensile strength was measured according to JIS K6251 under the condition of 23° C. The weld tensile strength retention was expressed in terms of percent by dividing the tensile strength of a sample having a weld portion by the tensile strength of a sample having no weld portion.

Weld tensile strength retention (%)=(weld tensile strength÷tensile strength)×100%

(3) Izod Impact Strength (−30° C.)

According to ASTM D256, an impact strength notched with a ⅛ inch thickness was measured at −30° C.

(4) Drop Dart Impact Strength (−30° C.)

Using 50 mm×90 mm×2.5 mm (thickness) plane table, total absorption energy at the time of destruction of the plane table was measured at −30° C. using a drop weight graphic impact tester manufactured by TOYO SEIKI SEISAKU-SHO, LTD.

(5) Presence or Absence of Layer Separation in Molded Product

For the purpose of judging whether the compatibility of respective components is good or not, a runner portion of a molded product was repeatedly bent at the time of molding, and then the presence or absence of the layer separation on a fracture surface was visually observed.

Examples 1 to 6 and Comparative Examples 1 to 8

Respective components, the amino group-containing hydrogenated block copolymer as the component (a) and the functional group-containing polyphenylene ether as the component (b), were blended with each other in a proportion as shown in Table 1 and Table 2, and the blend was melt-kneaded using a twin screw extruder equipped with a vent port (ZSK-40 manufactured by COPERION WERNER & PFLEIDERER, Germany), which had been set at 230 to 280° C., thereby obtaining a resin composition in a pellet form. The pellet was supplied into a screw-in-line type injection molding machine, which had been set at 230 to 280° C., and under the condition of a mold temperature of 60° C., ⅛ inch thick test pieces for both the tensile test and the weld tensile test were obtained. Further, a runner portion of the molded product prepared as the test piece for the tensile test was repeatedly bent, and then the presence or absence of the layer separation on a fracture surface was observed. Furthermore, the molecular weight of the resin composition obtained here in the form of a pellet was measured according to GPC (gel permeation chromatography), thereby determining the presence or absence of the graft copolymer. Physical properties of the test pieces obtained were measured, and the results thereof were also shown in Table 1 and Table 2.

TABLE 1

|  |  | Example 1 | Example 2 | Example 3 | Example 4 | Example 5 | Example 6 |
|---|---|---|---|---|---|---|---|
| Component (a) (a-1) | parts by wt | 10 | 10 |  | 20 | 30 | 40 |
| Component (a) (a-2) | parts by wt |  |  |  |  |  |  |
| Component (a) (a-5) | parts by wt |  |  | 10 |  |  |  |
| Component (a) (a-6) | parts by wt |  |  |  |  |  |  |
| Component (b) (b-1) | parts by wt |  |  | 90 |  |  |  |
| Component (b) (b-2) | parts by wt |  |  |  |  |  |  |
| Component (b) (b-3) | parts by wt | 90 |  |  |  |  |  |
| Component (b) (b-4) | parts by wt |  |  |  |  |  |  |
| Component (b) (b-5) | parts by wt |  | 90 |  | 80 | 70 | 60 |
| Component (b) (b-6) | parts by wt |  |  |  |  |  |  |
| Presence or absence of graft copolymer (determined by GPC) |  | Presence | Presence | Presence | Presence | Presence | Presence |
| Presence or absence of layer separation |  | Absence | Absence | Absence | Absence | Absence | Absence |
| Weld tensile strength retention (%) |  | 92 | 87 | 91 | 63 | 54 | 49 |

TABLE 2

|  |  | Com. Exp. 1 | Com. Exp. 2 | Com. Exp. 3 | Com. Exp. 4 | Com. Exp. 5 | Com. Exp. 6 | Com. Exp. 7 | Com. Exp. 8 |
|---|---|---|---|---|---|---|---|---|---|
| Component (a) (a-1) | parts by wt |  |  |  |  |  | 10 | 10 |  |
| Component (a) (a-2) | parts by wt | 10 | 10 |  | 20 | 30 |  |  |  |
| Component (a) (a-5) | parts by wt |  |  |  |  |  |  |  | 10 |
| Component (a) (a-6) | parts by wt |  |  | 10 |  |  |  |  |  |
| Component (b) (b-1) | parts by wt |  |  | 90 |  |  |  |  |  |
| Component (b) (b-2) | parts by wt |  |  |  |  |  |  |  | 90 |
| Component (b) (b-3) | parts by wt | 90 |  |  |  |  |  |  |  |
| Component (b) (b-4) | parts by wt |  |  |  |  |  | 90 |  |  |
| Component (b) (b-5) | parts by wt |  | 90 |  | 80 | 70 |  |  |  |
| Component (b) (b-6) | parts by wt |  |  |  |  |  |  | 90 |  |
| Presence or absence of graft copolymer (determined by GPC) |  | Absence | Absence | Absence | Absence | Absence | Absence | Absence | Absence |
| Presence or absence of layer separation |  | Presence | Presence | Presence | Presence | Presence | Presence | Presence | Presence |
| Weld tensile strength retention (%) |  | 18 | 32 | 17 | 0 | 0 | 13 | 14 | 0 |

Examples 7 to 16 and Comparative Examples 9 to 18

In a manner such that the amino group-containing hydrogenated block copolymer as the component (a) and the functional group-containing polyphenylene ether as the component (b) are continuously supplied from a first supplying port of an extruder, and the other thermoplastic resins as the component (d) is continuously supplied thereto from a second supplying port positioned at the center of said extruder, respective components in each proportion as shown in Table 3 and Table 4 were blended with one another. And the blend was melt-kneaded using a twin screw extruder equipped with a vent port (ZSK-40 manufactured by COPERION WERNER & PFLEIDERER, Germany), which had been set at 230 to 300° C., thereby obtaining a resin composition in a pellet form. The pellet was supplied into a screw-in-line type injection molding machine, which had been set at 240 to 300° C., and under the condition of a mold temperature of 60 to 130° C., a test piece for the tensile test, a test piece for the Izod impact test and a plane table (50 ml×90 mm×2.5 mm) for the drop dart impact test were obtained. Further, a runner portion of the molded product prepared as the test piece for the tensile test was repeatedly bent, and then the presence or absence of the layer separation on a fracture surface was observed. Physical properties of the test pieces obtained were measured, and the results thereof were also shown in Table 3 and Table 4. In addition, as to a resin composition comprising a graft copolymer obtained from the reaction of the components (a) and (b), the determination of the presence or absence of a graft copolymer was carried out in a manner such that the component (a) and the component (b) were continuously supplied from a first supplying port of the extruder, and after melt-kneading, the resulting melt-kneaded product was sampled out from a second supplying port positioned at the center of the extruder with no addition of the component (d), followed by measurement of the molecular weight according to GPC (gel permeation chromatography). The results thereof were also shown in Table 3 and Table 4.

TABLE 3

|  |  | Example 7 | Example 8 | Example 9 | Example 10 | Example 11 | Example 12 | Example 13 | Example 14 | Example 15 | Example 16 |
|---|---|---|---|---|---|---|---|---|---|---|---|
| Component (a) (a-1) | parts by wt | 5 |  |  | 10 |  |  |  | 10 | 15 |  |
| Component (a) (a-2) | parts by wt |  |  |  |  |  |  |  |  |  |  |
| Component (a) (a-3) | parts by wt |  |  | 10 |  |  | 9 |  |  |  |  |
| Component (a) (a-4) | parts by wt |  |  |  |  |  |  |  |  |  |  |
| Component (a) (a-5) | parts by wt |  |  |  |  | 10 |  |  |  |  |  |
| Component (a) (a-6) | parts by wt |  |  |  |  |  |  |  |  |  |  |
| Component (a) (a-7) | parts by wt |  | 7 |  |  |  |  | 8 |  |  | 15 |
| Component (a) (a-8) | parts by wt |  |  |  |  |  |  |  |  |  |  |
| Component (b) (b-5) | parts by wt |  |  | 20 |  | 40 |  |  | 40 |  |  |
| Component (b) (b-6) | parts by wt |  |  |  |  |  |  |  |  |  |  |
| Component (b) (b-7) | parts by wt | 5 | 13 |  | 30 |  | 21 | 32 |  |  |  |
| Component (b) (b-8) | parts by wt |  |  |  |  |  |  |  |  |  |  |
| Component (b) (b-9) | parts by wt |  |  |  |  |  |  |  |  | 35 | 35 |
| Component (b) (b-10) | parts by wt |  |  |  |  |  |  |  |  |  |  |
| Component (d) (d-1) | parts by wt |  |  |  |  |  | 70 | 60 | 50 |  |  |
| Component (d) (d-2) | parts by wt | 90 | 80 | 70 | 60 | 50 |  |  |  |  |  |
| Component (d) (d-3) | parts by wt |  |  |  |  |  |  |  |  | 50 |  |
| Component (d) (d-4) | parts by wt |  |  |  |  |  |  |  |  |  | 50 |
| Presence or absence of graft copolymer (determined by GPC) |  | Presence | Presence | Presence | Presence | Presence | Presence | Presence | Presence | Presence | Presence |
| Presence or absence of layer separation |  | Absence | Absence | Absence | Absence | Absence | Absence | Absence | Absence | Absence | Absence |
| Izod impact strength (−30° C.) | Kg cm/cm notch | 4 | 8 | 11 | 10 | 12 | 10 | 16 | 18 | 14 | 6 |
| Drop dart impact strength (−30° C.) | J | 18 | 20 | 24 | 27 | 31 | 20 | 32 | 41 | 29 | 17 |

TABLE 4

|  |  | Com. Exp. 9 | Com. Exp. 10 | Com. Exp. 11 | Com. Exp. 12 | Com. Exp. 13 | Com. Exp. 14 | Com. Exp. 15 | Com. Exp. 16 | Com. Exp. 17 | Com. Exp. 18 |
|---|---|---|---|---|---|---|---|---|---|---|---|
| Component (a) (a-1) | parts by wt |  |  |  |  |  |  |  |  |  |  |
| Component (a) (a-2) | parts by wt | 5 |  |  | 10 |  |  |  | 10 | 15 |  |
| Component (a) (a-3) | parts by wt |  |  |  |  |  |  |  |  |  |  |
| Component (a) (a-4) | parts by wt |  |  | 10 |  |  | 9 |  |  |  |  |

TABLE 4-continued

| | | Com. Exp. 9 | Com. Exp. 10 | Com. Exp. 11 | Com. Exp. 12 | Com. Exp. 13 | Com. Exp. 14 | Com. Exp. 15 | Com. Exp. 16 | Com. Exp. 17 | Com. Exp. 18 |
|---|---|---|---|---|---|---|---|---|---|---|---|
| Component (a) (a-5) | parts by wt | | | | | | | | | | |
| Component (a) (a-6) | parts by wt | | | | | 10 | | | | | |
| Component (a) (a-7) | parts by wt | | | | | | | | | | |
| Component (a) (a-8) | parts by wt | | 7 | | | | | 8 | | | 15 |
| Component (b) (b-5) | parts by wt | | | 20 | | 40 | | | 40 | | |
| Component (b) (b-6) | parts by wt | | | | | | | | | | |
| Component (b) (b-7) | parts by wt | 5 | 13 | | 30 | | 21 | 32 | | | |
| Component (b) (b-8) | parts by wt | | | | | | | | | | |
| Component (b) (b-9) | parts by wt | | | | | | | | | 35 | 35 |
| Component (b) (b-10) | parts by wt | | | | | | | | | | |
| Component (d) (d-1) | parts by wt | | | | | | 70 | 60 | 50 | | |
| Component (d) (d-2) | parts by wt | 90 | 80 | 70 | 60 | 50 | | | | | |
| Component (d) (d-3) | parts by wt | | | | | | | | | 50 | |
| Component (d) (d-4) | parts by wt | | | | | | | | | | 50 |
| Presence or absence of graft copolymer (determined by GPC) | | Absence | Absence | Absence | Absence | Absence | Absence | Absence | Absence | Absence | Absence |
| Presence or absence of layer separation | | Presence | Presence | Presence | Presence | Presence | Presence | Presence | Presence | Presence | Presence |
| Izod impact strength (−30° C.) | Kg cm/cm notch | 1 | 1 | 1 | 2.0 | 3.3 | 2.1 | 3.6 | 8 | 2.7 | 1 |
| Drop dart impact strength (−30° C.) | J | 1.7 | 2.6 | 3.0 | 3.1 | 6.2 | 2.4 | 3.4 | 9 | 5.8 | 2.1 |

Examples 17 to 22 and Comparative Examples 19 to 21

Respective components, the amino group-containing hydrogenated block copolymer as the component (a), the functional group-containing polyolefin as the component (c) and the polyolefin as the component (d), were blended with one another in a proportion as shown in Table 5. And the blend was melt-kneaded using a twin screw extruder equipped with a vent port (ZSK-40 manufactured by COPERION WERNER & PFLEIDERER, Germany), which had been set at 210 to 290° C., thereby obtaining a resin composition in a pellet form. The pellet was supplied into a screw-in-line type injection molding machine, which had been set at 210 to 270° C., and under the condition of a mold temperature of 60° C., ⅛ inch thick test pieces for both the tensile test and the weld tensile test were obtained. Further, a runner portion of the molded product prepared as the test piece for the tensile test was repeatedly bent, and then the presence or absence of the layer separation on a fracture surface was observed. Furthermore, under the same molding conditions, test pieces for both the Izod impact test and drop dart impact test were obtained. Physical properties of the test pieces obtained were measured, and the results thereof were also shown in Table 5.

TABLE 5

| | Example 17 | Example 18 | Example 19 | Example 20 | Example 21 | Example 22 | Comp. Exp. 19 | Comp. Exp. 20 | Comp. Exp. 21 |
|---|---|---|---|---|---|---|---|---|---|
| Proportion of materials at 1st supplying port of extruder (parts by weight) | | | | | | | | | |
| (d-2) | 30 | 30 | 30 | 15 | | 30 | 30 | 30 | |
| (d-5) | 8 | | | 5 | | 5 | 8 | 5 | |
| (a-1) | 2.5 | | | | | 2.5 | | | |
| (a-2) | | | | | | | 2.5 | 2.5 | |
| (a-3) | | 10 | | | 40 | | | | |
| (a-4) | | | | | | | | | 40 |

TABLE 5-continued

|  |  | Example 17 | Example 18 | Example 19 | Example 20 | Example 21 | Example 22 | Comp. Exp. 19 | Comp. Exp. 20 | Comp. Exp. 21 |
|---|---|---|---|---|---|---|---|---|---|---|
| (a-5) | | | | 10 | | | | | | |
| (a-7) | | | | | 5 | | | | | |
| (c-1) | | 2.5 | | 5 | | 60 | | 2.5 | | 60 |
| (c-2) | | | 5 | | 5 | | | | | |
| (c-3) | | | | | | | 2.5 | | | |
| (c-4) | | | | | | | | | 2.5 | |
| (d-6) | | | | | 80 | | | | | |
| Proportion of materials at 2nd supplying port of extruder (parts by weight | | | | | | | | | | |
| (d-2) | | 62 | 70 | 70 | 80 | 20 | 65 | 62 | 65 | 20 |
| Physical properties | | | | | | | | | | |
| Presence or absence of layer separation | | — | Absence | Absence | Absence | Absence | Absence | Absence | Absence | Absence |
| Tensile strength | MPa | 40 | 41 | 40 | 39 | 28 | 42 | 35 | 38 | 16 |
| Weld tensile strength retention | % | 94 | 96 | 97 | 95 | 98 | 95 | 78 | 80 | 61 |
| Izod impact strength (−30° C.) | J/m | 180 | 170 | 190 | 160 | 410 | 170 | 70 | 65 | 150 |
| Drop dart impact strength (−30° C.) | J | 24 | 23 | 21 | 20 | 49 | 28 | 6 | 5 | 15 |

Examples 23 to 29 and Comparative Examples 22 to 24

Respective components, the amino group-containing hydrogenated block copolymer as the component (a), the functional group-containing polyolefin as the component (c), the polyolefin as the component (d) and the polyphenylene ether as the component (d) (and the functional group-containing polyphenylene ether as the component (b)), were blended with one another in a proportion as shown in Table 6. And the blend was melt-kneaded using a twin screw extruder equipped with a vent port (ZSK-40 manufactured by COPERION WERNER & PFLEIDERER, Germany), which had been set at 230 to 310° C., thereby obtaining a resin composition in a pellet form. The pellet was supplied into a screw-in-line type injection molding machine, which had been set at 230 to 290° C., and under the condition of a mold temperature of 60° C., ⅛ inch thick test pieces for both the tensile test and the weld tensile test were obtained. Further, a runner portion of the molded product prepared as the test piece for the tensile test was repeatedly bent, and then the presence or absence of the layer separation on a fracture surface was observed. Furthermore, under the same conditions, test pieces for both the Izod impact test and drop dart impact test were obtained. Physical properties of the test pieces obtained were measured, and the results thereof were also shown in Table 6.

TABLE 6

| | Example 23 | Example 24 | Example 25 | Example 26 | Example 27 | Example 28 | Example 29 | Comp. Exp. 22 | Comp. Exp. 23 | Comp. Exp. 24 |
|---|---|---|---|---|---|---|---|---|---|---|
| Proportion of materials at 1st supplying port of extruder (parts by weight) | | | | | | | | | | |
| (d-2) | 20 | 20 | | | | | | 20 | | |
| (d-5) | | | | | | 5 | 10 | | | 5 |
| (a-1) | | | | 15 *1, *2 | | | | | | |
| (a-2) | | | | | | | | | | |
| (a-3) | 2.5 | | | | | 25 | | | | |
| (a-4) | | | | | | | | | 2.5 | 25 |
| (a-5) | | 5 | | | 15 | | | | | |
| (a-7) | | | 10 | | | | 15 | | | |
| (a-8) | | | | | | | | | 10 | |
| (c-1) | | 10 | | 10 *2 | 10 | | | | | |
| (c-2) | 10 | | 10 | | | | | 10 | 10 | |
| (c-3) | | | | | | 10 | 10 | | | 10 |
| (d-6) | 10 | | 30 | | 20 | 10 | 10 | 10 | 30 | 10 |
| (d-7) | | 10 | | 20 | 70 | | | | | |
| (b-5) | | | | 10 *1 | | | | | | |

TABLE 6-continued

|  |  | Example 23 | Example 24 | Example 25 | Example 26 | Example 27 | Example 28 | Example 29 | Comp. Exp. 22 | Comp. Exp. 23 | Comp. Exp. 24 |
|---|---|---|---|---|---|---|---|---|---|---|---|
| Proportion of materials at 2nd supplying port of extruder (parts by weight) | | | | | | | | | | | |
| (d-2) | | 60 | 60 | 60 | 60 | 20 | | | 60 | 60 | |
| (d-6) | | | | | | | 50 | 55 | | | 50 |
| Physical properties | | | | | | | | | | | |
| Presence or absence of layer separation | — | Absence | Absence | Absence | Absence | Absence | Absence | Absence | Presence | Presence | Presence |
| Tensile strength | MPa | 39 | 39 | 38 | 37 | 34 | 49 | 46 | 31 | 28 | 41 |
| Weld tensile strength retention | % | 94 | 92 | 90 | 88 | 61 | 78 | 75 | 67 | 52 | 43 |
| Izod impact strength (−30° C.) | J/m | 60 | 70 | 80 | 100 | 50 | 240 | 190 | 20 | 10 | 110 |
| Drop dart impact strength (−30° C.) | J | 10 | 14 | 27 | 25 | 10 | 25 | 27 | 4 | 6 | 10 |

*1 A melt-kneaded product of the component (a) + the component (b) was prepared and then used. Incidentally, the amount of the component (a) used in the prior melt-kneading step was 1/2 time that used for the final composition.
*2 A melt-kneaded product of the component (a) + the component (c) was prepared and then used. Incidentally, the amount of the component (a) used in the prior melt-kneading step was 1/2 time that used for the final composition.

Examples 30 to 36 and Comparative Examples 25 to 27

Respective components, the amino group-containing hydrogenated block copolymer as the component (a), the functional group-containing polyphenylene ether as the component (b), the functional group-containing polyolefin as the component (c) and the polyolefin as the component (d), were blended with one another in a proportion as shown in Table 7. And the blend was melt-kneaded using a twin screw extruder equipped with a vent port (ZSK-40 manufactured by COPERION WERNER & PFLEIDERER, Germany), which had been set at 230 to 310° C., thereby obtaining a resin composition in a pellet form. The pellet was supplied into a screw-in-line type injection molding machine, which had been set at 230 to 310° C., and under the condition of a mold temperature of 60° C., 1/8 inch thick test pieces for both the tensile test and the weld tensile test were obtained. Further, a runner portion of the molded product prepared as the test piece for the tensile test was repeatedly bent, and then the presence or absence of the layer separation on a fracture surface was observed. Furthermore, under the same conditions, test pieces for both the Izod impact test and drop dart impact test were obtained. Physical properties of the test pieces obtained were measured, and the results thereof were also shown in Table 7.

TABLE 7

|  | Example 30 | Example 31 | Example 32 | Example 33 | Example 34 | Example 35 | Example 36 | Comp. Exp. 25 | Comp. Exp. 26 | Comp. Exp. 27 |
|---|---|---|---|---|---|---|---|---|---|---|
| Proportion of materials at 1st supplying port of extruder (parts by weight) | | | | | | | | | | |
| (d-2) | 20 | 20 | | | | | | 20 | | |
| (d-5) | | | | | | 5 | 10 | | | 5 |
| (a-1) | | | | 15 *1, *2 | | | | | | |
| (a-3) | 2.5 *1, *2 | | | | | 25 *1, *2 | | | | |
| (a-4) | | | | | | | | 2.5 *1, *2 | | 25 *1, 2 |
| (a-5) | | 5 *1, *2 | | | *1, *2 15 | | | | | |
| (a-7) | | | 10 *1, *2 | | | | 15 *1, *2 | | | |
| (a-8) | | | | | | | | | 10 *1, *2 | |
| (c-1) | | 10 *2 | | 10 *2 | *2 10 | | | | | |
| (c-2) | 10 *2 | | 10 *2 | | | | | 10 *2 | 10 *2 | |
| (c-3) | | | | | | 10 *2 | 10 *2 | | | 10 *2 |
| (b-5) | 10 *1 | 10 *1 | | 30 *1 | *1 10 | | | 10 *1 | | |
| (b-7) | | | 30 *1 | | | 10 *1 | 10 *1 | | 30 *1 | 10 *1 |

TABLE 7-continued

|  |  | Example 30 | Example 31 | Example 32 | Example 33 | Example 34 | Example 35 | Example 36 | Comp. Exp. 25 | Comp. Exp. 26 | Comp. Exp. 27 |
|---|---|---|---|---|---|---|---|---|---|---|---|
| Proportion of materials at 2nd supplying port of extruder (parts by weight |  |  |  |  |  |  |  |  |  |  |  |
| (d-2) |  | 60 | 60 | 60 | 60 | 20 |  |  | 60 | 60 |  |
| (b-5) |  |  |  |  |  | 60 |  |  |  |  |  |
| (b-7) |  |  |  |  |  |  | 50 | 55 |  |  | 50 |
| Physical properties |  |  |  |  |  |  |  |  |  |  |  |
| Presence or absence of layer separation |  | — | Absence | Absence | Absence | Absence | Absence | Absence | Absence | Presence | Presence | Presence |
| Tensile strength | MPa | 40 | 40 | 39 | 36 | 33 | 50 | 45 | 29 | 23 | 38 |
| Weld tensile strength retention | % | 95 | 96 | 94 | 90 | 64 | 77 | 78 | 64 | 46 | 45 |
| Izod impact strength (−30° C.) | J/m | 50 | 60 | 60 | 80 | 40 | 250 | 170 | 10 | 10 | 90 |
| Drop dart impact strength (−30° C.) | J | 12 | 11 | 16 | 23 | 11 | 20 | 24 | 3 | 4 | 8 |

*1 A melt-kneaded product of the component (a) + the component (b) was prepared and then used. Incidentally, the amount of the component (a) used in the prior melt-kneading step was 1/2 time that used for the final composition.
*2 A melt-kneaded product of the component (a) + the component (c) was prepared and then used. Incidentally, the amount of the component (a) used in the prior melt-kneading step was 1/2 time that used for the final composition.

Examples 37 to 39 and Comparative Examples 28 to 30

Using the amino group-containing hydrogenated block copolymer as the component (a), the functional group-containing polyphenylene ether as the component (b), the polyphenylene sulfide, styrene-glycidyl methacrylate copolymer as the component (d) and the inorganic filler as the component (e) in a proportion as shown in Table 8, and a twin screw extruder equipped with a vent port (ZSK-40 manufactured by COPERION WERNER & PFLEIDERER, Germany), which had been set at 290 to 310° C., the components (a) and (b) were supplied therein from a first port of the extruder, followed by melt-kneading, further the polyphenylene sulfide, styrene-glycidyl methacrylate copolymer as the component (d) was supplied therein from a mean point of the extruder, and then the inorganic filler as the component (e) was supplied therein from a third port of the extruder, followed by melt-kneading, thereby obtaining a resin composition in a pellet form. The pellet was supplied into a screw-in-line type injection molding machine set, which had been set at 300 to 320° C., and under the condition of a mold temperature of 130° C., ⅛ inch thick test pieces for both the tensile test and the weld tensile test were obtained. Further, a runner portion of the molded product prepared as the test piece for the tensile test was repeatedly bent, and then the presence or absence of the layer separation on a fracture surface was observed.

Physical properties of the test pieces obtained were measured, and the results thereof were also shown in Table 8.

TABLE 8

|  |  | Example 37 | Example 38 | Example 39 | Comp. Exp. 28 | Comp. Exp. 29 | Comp. Exp. 30 |
|---|---|---|---|---|---|---|---|
| Component (a) (a-1) | parts by wt | 20 |  |  |  |  |  |
| Component (a) (a-2) | parts by wt |  |  |  | 20 |  |  |
| Component (a) (a-3) | parts by wt |  | 20 | 20 |  |  | 20 |
| Component (a) (a-4) | parts by wt |  |  |  |  | 20 |  |
| Component (b) (b-5) | parts by wt | 30 |  |  |  |  |  |
| Component (b) (b-6) | parts by wt |  |  |  |  | 30 |  |
| Component (b) (b-7) | parts by wt |  | 30 | 20 |  | 30 |  |
| Component (b) (b-8) | parts by wt |  |  |  |  |  | 30 |
| Component (d) (d-3) | parts by wt |  | 70 |  |  | 70 |  |

TABLE 8-continued

|  |  | Example 37 | Example 38 | Example 39 | Comp. Exp. 28 | Comp. Exp. 29 | Comp. Exp. 30 |
|---|---|---|---|---|---|---|---|
| Component (d) (d-4) | parts by wt | 70 |  | 80 | 70 |  | 80 |
| Component (d) (d-8) | parts by wt | 3 | 3 | 3 | 3 | 3 | 3 |
| Component (e) (e-1) | parts by wt | 25 | 25 | 25 | 25 | 25 | 25 |
| Component (e) (e-2) | parts by wt | 25 | 25 | 25 | 25 | 25 | 25 |
| Presence or absence of layer separation |  | Absence | Absence | Absence | Absence | Absence | Absence |
| Weld tensile strength retention (%) |  | 67 | 70 | 64 | 38 | 29 | 34 |

INDUSTRIAL APPLICABILITY

The graft copolymer-containing resin composition in accordance with the present invention is suitable for car parts, more specifically exterior parts such as bumpers, fenders, door panels, various mauls, emblems, engine hoods, under hoods, wheel caps, roofs, spoilers and various aero-parts, and interior parts such as instrumental panels, console boxes and trims. The resin composition is also suitable for other uses, more specifically interior or exterior parts of electric appliances, computers and their peripheral devices, chassis and cabinets for other OA instruments, TV, videos, MD, MP3, CDROM, CDR, DVDROM, DVDRAM, DVD-R and DVD-RW and other disk players, and optical pick up slide bases and structure parts. Further, the resin composition can be used suitably for lead storage batteries in which electrodes, an electrolyte and a separator are directly housed, nickel hydrogen battery cases and lithium ion battery cases. These battery cases are suitable for any of open-type secondary battery cases and closed type secondary battery cases. Furthermore, the resin composition can be used as a material of battery cases capable of housing more than one battery of these kinds.

What is claimed is:

1. A resin composition containing a graft copolymer obtained by reacting 1 to 99 parts by weight of (a) an amino group-containing hydrogenated block copolymer obtained through hydrogenation of an amino group-containing block copolymer with 99 to 1 part by weight of (b) a functional group-containing polyphenylene ether having any one functional group selected from the group consisting of a carboxyl group, an acid anhydride group and an epoxy group and/or (c) a functional group-containing polyolefin having any one functional group selected from a group consisting of a carboxyl group, an acid anhydride group and an epoxy group, wherein the amino group-containing block copolymer is obtained by reacting a living terminal lithium ion group of a vinyl aromatic compound-conjugated diene compound block copolymer chain, which is formed using an organic lithium compound as a polymerization initiator in a hydrocarbon solvent with a cyclic compound represented by the following formula (1) or (2),

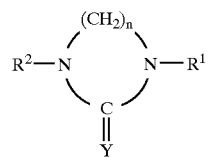

wherein $R^1$ and $R^2$ are independently of each other an alkyl or alkoxy group having 1 to 4 carbon atoms, Y is an oxygen atom or a sulfur atom, and n is an integer of 2 to 4,

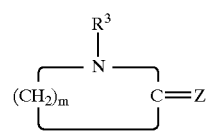

wherein $R^3$ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms.

2. A resin composition comprising 1 to 99 parts by weight of a resin composition containing a graft copolymer obtained by reacting 1 to 99 parts by weight of (a) an amino group-containing hydrogenated block copolymer obtained through hydrogenation of an amino group-containing block copolymer with 99 to 1 part by weight of (b) a functional group-containing polyphenylene ether having any one functional group selected from the group consisting of a carboxyl group, an acid anhydride group and an epoxy group and/or (c) a functional group-containing polyolefin having any one functional group selected from a group consisting of a carboxyl group, an acid anhydride group and an epoxy group, wherein the amino group-containing block copolymer is obtained by reacting a living terminal lithium ion group of a vinyl aromatic compound-conjugated diene compound block copolymer chain, which is formed using an organic lithium compound as a polymerization initiator in a hydrocarbon solvent with a cyclic compound represented by the following formula (1) or (2),

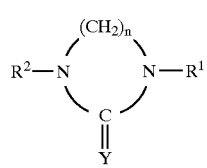

(1)

wherein R¹ and R² are independently of each other an alkyl or alkoxy group having 1 to 4 carbon atoms, Y is an oxygen atom or a sulfur atom, and n is an integer of 2 to 4,

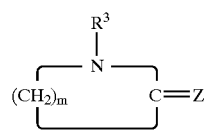

(2)

wherein R³ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms, and 99 to 1 part by weight of (d) a thermoplastic resin excepting the above-defined components (a) to (c).

3. A resin composition comprising a resin composition comprising 1 to 99 parts by weight of a resin composition containing a graft copolymer obtained by reacting 1 to 99 parts by weight of (a) an amino group-containing hydrogenated block copolymer obtained through hydrogenation of an amino group-containing block copolymer with 99 to 1 part by weight of (b) a functional group-containing polyphenylene ether having any one functional group selected from the group consisting of a carboxyl group, an acid anhydride group and an epoxy group and/or (c) a functional group-containing polyolefin having any one functional group selected from a group consisting of a carboxyl group, an acid anhydride group and an epoxy group, wherein the amino group-containing block copolymer is obtained by reacting a living terminal lithium ion group of a vinyl aromatic compound-conjugated diene compound block copolymer chain, which is formed using an organic lithium compound as a polymerization initiator in a hydrocarbon solvent with a cyclic compound represented by the following formula (1) or (2),

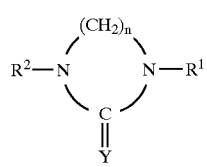

(1)

wherein R¹ and R² are independently of each other an alkyl or alkoxy group having 1 to 4 carbon atoms, Y is an oxygen atom or a sulfur atom, and n is an integer of 2 to 4,

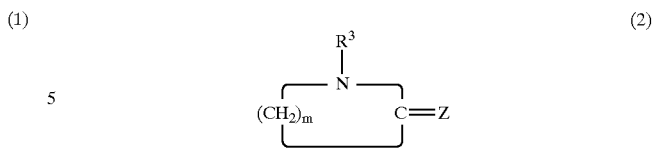

(2)

wherein R³ is an alkyl, cycloalkyl or alkoxy group having 1 to 6 carbon atoms, Z is an oxygen atom or a sulfur atom, and m is an integer of 3 or 4, provided that one or more hydrogen atoms in the polymethylene chain may be substituted with an alkyl group having 1 to 6 carbon atoms, and 99 to 1 part by weight of (d) a thermoplastic resin excepting the above-defined components (a) to (c), and (e) an inorganic filler in an amount of from 1 to 250 parts by weight based on 100 parts by weight of the above-defined resin composition.

4. The resin composition according to any one of claims 1 to 3, wherein a vinyl aromatic compound content in a vinyl aromatic compound-conjugated diene compound block copolymer, which is a precursor of the amino group-containing hydrogenated block copolymer as the component (a), is from 1 to 95% by weight.

5. The resin composition according to any one of claims 1 to 3, wherein the sum of a 1,2-vinyl bond content and a 3,4-vinyl bond content showing a bonding state of the conjugated diene compound in a vinyl aromatic compound-conjugated diene compound block copolymer, which is a precursor of the amino group-containing hydrogenated block copolymer as the component (a), is from 2 to 85% by weight.

6. The resin composition according to any one of claims 1 to 3, wherein the amino group-containing hydrogenated block copolymer as the component (a) is the one obtained by diminishing an olefinically unsaturated bond originated from the conjugated diene compound present in the precursor amino group-containing block copolymer chain to the extent of not more than 90%.

7. The resin composition according to any one of claims 1 to 3, wherein a number average molecular weight of an unmodified polyphenylene ether, which is a precursor of the functional group-containing polyphenylene ether as the component (b) is not less than 1,000 calibrated with polystyrene standard according to GPC.

8. The resin composition according to any one of claims 1 to 3, wherein the functional group-containing polyphenylene ether as the component (b) is an acid anhydride group-containing polyphenylene ether obtained by adding 0.05 to 30 parts by weight of maleic anhydride to 100 parts by weight of the precursor polyphenylene ether.

9. The resin composition according to any one of claims 1 to 3, wherein a polyolefin, which is a precursor of the functional group-containing polyolefin as the component (c) before the addition of functionality, is a polyolefin selected from the group consisting of isotactic polypropylene, poly (4-methyl-1-pentene), polybutene-1, high density polyethylene, ultra high molecular weight high density polyethylene, low density polyethylene, linear low density polyethylene, ultra low density polyethylene having density of lower than 0.90 and a copolymer of ethylene and propylene or other α-olefins, which is substantially freed from a carboxyl group, an acid anhydride group, an epoxy group and other functional groups originated from a copolymerization monomer.

10. The resin composition according to any one of claims 1 to 3, wherein the functional group-containing polyolefin as the component (c) is an acid anhydride group-containing polyolefin obtained by adding 0.05 to 30 parts by weight of maleic anhydride to 100 parts by weight of the precursor polyolefin.

11. The resin composition according to claim 2 or 3, wherein the thermoplastic resin as the component (d) is at least one member selected from the group consisting of polyolefins, styrenic resins, polyamides, polyesters, polyphenylene ethers, polyphenylene sulfides and liquid crystal polyesters.

12. The resin composition according to claim 11, wherein the polyolefin as the component (d) is at least one polyolefin selected from the group consisting of isotactic polypropylene, poly(4-methyl-1-pentene), polybutene-1, high density polyethylene, ultra high molecular weight high density polyethylene, low density polyethylene, linear low density polyethylene, ultra low density polyethylene having density of lower than 0.90 and a copolymer of ethylene and propylene or other α-olefins, which is substantially freed from a carboxyl group, an acid anhydride group, an epoxy group and other functional groups originated from a copolymerization monomer.

13. The resin composition according to claim 11, wherein the styrenic resin as the component (d) is at least one member selected from the group consisting of atactic polystyrene, and syndiotactic polystyrene.

14. The resin composition according to claim 11, wherein the polyamide as the component (d) is at least one member selected from the group consisting of polyamide 6, polyamide 6, 6, polyamide 4, 6, polyamide 11, polyamide 12, polyamide 6, 10, polyamide 6, 12, polyamide 6/6, 6, polyamide 6/6, 12, polyamide MXD (m-xylylenediamine)/6, polyamide 6, T, polyamide 6, I, polyamide 6/6, T, polyamide 6/6, I, polyamide 6, 6/6, T, polyamide 6, 6/6, I, polyamide 6/6, T/6, I, polyamide 6,6/6, T/6, I, polyamide 6/12/6, T, polyamide 6, 6/12/6, T, polyamide 6/12/6, I, polyamide 6, 6/12/6, I, poly(p-phenyleneterephthalamide), poly(p-benzamide), poly(4,4'-benzanilideterephthalamide), poly(p-phenylene-4,4'-biphenylenedicarboxyamide), poly(p-phenylene-2,6-naphthalenedicarboxyamide), poly(2-chloro-p-phenyleneterephthalamide) and p-phenylenediamine/2,6-dichloro-p-phenylenediamine/terephthalic dichloride copolymer.

15. The resin composition according to claim 11, wherein the polyester as the component (d) is at least one member selected from the group consisting of polyethylene terephthalate, polytrimethylene terephthalate and polybutylene terephtalate.

16. The resin composition according to claim 2 or 3, wherein the thermoplastic resin as the component (d) is at least two members selected from the group consisting of polyphenylene sulfides, polyethylene terephthalates, polytrimethylene terephthalates, polybutylene terephthalates, polyphenylene ethers, polycarbonates, ethylene-glycidyl methacrylate copolymers, styrene-glycidyl methacrylate copolymers and styrene/2-isopropenyl-2-oxazoline copolymers.

17. The resin composition according to claim 3, wherein the inorganic filler as the component (e) is at least one member selected from the group consisting of an inorganic salt, glass fiber, glass flake, glass beads, carbon fiber, whisker, mica, talc, carbon black, titanium oxide, calcium carbonate, potassium titanate, wallastonite, a heat conductive substance such as graphite, aluminum nitride, boron nitride, alumina, beryllium oxide, silicon dioxide, magnesium oxide, aluminum nitrate or barium sulfate, electrically conductive metal fiber, electrically conductive metal flake, electrical conductivity-carrying carbon black or electrical conductivity-carrying carbon fiber.

18. A process for producing the resin composition according to any of claim 2 or 3, comprising heat-melt-kneading the component (a) and the component (b) and/or the component (c) with use of a heat melt kneading machine set at a temperature of not lower than 150° C.

19. The resin composition according to any one of claims 1 to 3, wherein the functional group-containing polyphenylene ether as the component (b) is obtained by adding a functional group-containing compound selected from the group consisting of a carboxyl group containing compound, an acid anhydride-containing compound and an epoxy group-containing compound to a precursor polyphenylene ether, wherein the functional group-containing polyolefin as the component (c) is obtained by adding a functional group-containing compound selected from the group consisting of a carboxyl group containing unsaturated compound, an acid anhydride-containing unsaturated compound and an epoxy group-containing unsaturated compound to a precursor polyolefin.

* * * * *